(12) United States Patent
Treister et al.

(10) Patent No.: US 7,570,614 B2
(45) Date of Patent: *Aug. 4, 2009

(54) APPROACH FOR MANAGING COMMUNICATIONS CHANNELS BASED ON PERFORMANCE

(75) Inventors: Bijan Treister, Kew (AU); Hongbing Gan, Carlton North (AU); Efstratios Skafidas, Coburg (AU)

(73) Assignee: Bandspeed, Inc., Austin, TX (US)

( * ) Notice: Subject to any disclaimer, the term of this patent is extended or adjusted under 35 U.S.C. 154(b) by 1555 days.

This patent is subject to a terminal disclaimer.

(21) Appl. No.: 09/948,499

(22) Filed: Sep. 6, 2001

(65) Prior Publication Data

US 2002/0097681 A1    Jul. 25, 2002

Related U.S. Application Data

(60) Provisional application No. 60/264,345, filed on Jan. 25, 2001.

(51) Int. Cl.
*H04W 4/00*      (2009.01)
*H04W 72/00*    (2009.01)
*H04B 17/02*     (2006.01)

(52) U.S. Cl. .................. 370/329; 370/332; 455/134; 455/452

(58) Field of Classification Search ............ 370/329, 370/332, 333, 341, 389, 431, 432, 318, 229; 455/135, 453, 13.4, 114.2, 115.1, 134
See application file for complete search history.

(56) References Cited

U.S. PATENT DOCUMENTS

| | | |
|---|---|---|
| 4,716,573 A | 12/1987 | Bergstrom et al. |
| 4,780,885 A | 10/1988 | Paul et al. |
| 5,317,568 A | 5/1994 | Bixby et al. |
| 5,323,447 A | 6/1994 | Gillis et al. |
| 5,394,433 A | 2/1995 | Bantz et al. |

(Continued)

FOREIGN PATENT DOCUMENTS

| GB | 2 401 512 A1 | 11/2004 |
|---|---|---|
| WO | WO 96/34468 A1 | 10/1996 |

OTHER PUBLICATIONS

Walter L. Davis, "A MAC Layer submission for the High Rate 802.15.3 Standard," Project: IEEE P802.15 Working Group for Wireless Personal Area Networks (WPANs), Sep. 2000, XP 002220853, pp. 1-57.

(Continued)

*Primary Examiner*—Hanh Nguyen
(74) *Attorney, Agent, or Firm*—Hickman Palermo Truong & Becker LLP

(57) ABSTRACT

An approach for managing communications channels based on performance involves selecting a particular channel based on channel performance. Based on the selected channel, channel identification data is provided to another participant of the communications system to determine on which channel to respond. For example, the other participant may respond on the selected channel, avoid using the selected channel to respond, or skip the selected channel in a sequence of channels, such as a frequency hopping sequence. The communication sent in response may include a performance measurement of the channel used to provide the channel identification data. According to another aspect of the invention, a particular participant is selected from a group of participants based on the performance of a particular channel. According to yet another aspect, performance data is maintained, such as in a lookup table, and the performance data may be shared between participants of the communications system.

97 Claims, 13 Drawing Sheets

U.S. PATENT DOCUMENTS

| | | | |
|---|---|---|---|
| 5,418,839 A | 5/1995 | Knuth et al. | |
| 5,541,954 A | 7/1996 | Emi | |
| 5,574,979 A | 11/1996 | West | |
| 5,649,291 A | 7/1997 | Tayloe | |
| 5,726,978 A | 3/1998 | Frodigh et al. | |
| 5,774,808 A | 6/1998 | Särkioja et al. | |
| 5,781,861 A | 7/1998 | Kang et al. | |
| 5,844,522 A | 12/1998 | Sheffer et al. | |
| 5,873,036 A | 2/1999 | Vucetic | |
| 5,898,928 A | 4/1999 | Karlsson et al. | |
| 5,956,642 A | 9/1999 | Larsson et al. | |
| 6,009,332 A | 12/1999 | Haartsen | |
| 6,169,761 B1 | 1/2001 | Marcoccia et al. | |
| 6,240,126 B1 | 5/2001 | Ohashi et al. | |
| 6,549,784 B1 | 4/2003 | Kostic et al. | |
| 6,601,101 B1 | 7/2003 | Lee et al. | |
| 6,633,761 B1 | 10/2003 | Singhal et al. | |
| 6,650,872 B1 * | 11/2003 | Karlsson | 455/67.11 |
| 6,687,239 B1 * | 2/2004 | Koprivica | 370/341 |
| 6,694,147 B1 | 2/2004 | Viswanath et al. | |
| 6,700,875 B1 * | 3/2004 | Schroeder et al. | 370/252 |
| 6,704,346 B1 | 3/2004 | Mansfield | |
| 6,745,034 B2 | 6/2004 | Wang et al. | |
| 6,751,249 B1 | 6/2004 | Cannon et al. | |
| 6,760,317 B1 * | 7/2004 | Honkanen et al. | 370/329 |
| 6,975,603 B1 * | 12/2005 | Dicker et al. | 370/329 |
| 7,027,418 B2 | 4/2006 | Gan et al. | |
| 2002/0122462 A1 | 9/2002 | Batra et al. | |
| 2005/0020271 A1 | 1/2005 | Fukuda et al. | |
| 2005/0223115 A1 | 10/2005 | Hanson et al. | |

OTHER PUBLICATIONS

Jeyhan Karaoguz, "Multi-Rate QAM Physical Layer (8-40 Mbps) Proposal for High Rate WPAN," Project: IEEE P802.15 Working Group for Wireless Personal Area Networks (WPANs), Oct. 20, 2000, XP002220854, pp. 1-39.

Gan et al., "Adaptive Frequency Hopping Implementation Proposals for IEEE 802.15.1/2 WPAN," Bandspeed Pty Ltd., Nov. 2000, pp. 1-28.

IEE Proc.-Commun., vol. 142, No. 2, Apr. 1995, entitled "Adaptive frequency hopping in HF communications", by J. Zander, PhD and G. Malmgren, MSc, (pp. 99-105).

Fifth International Symposium on Signal Processing and its Applications, ISSPA '99 Brisbane, Australia, Aug. 22-25, 1999, entitled "Multiuser OFDM", by E. Lawrey, (pp. 761-764).

Martin Johnson, "HiperLAN/2-The Broadband Radio Transmission Technology Operating in the 5 GHz Frequency Band," pp. 1-22, 1999.

European Patent Office, "Communication pursuant to Article 96(2) EPC," Jun. 22, 2004, 5 pages.

"Clean Version of Amended Claims for Response to Official Comm. From Patent Examiner," EPO Patent Application No. 02709170.1, pp. 1-15.

Lawrey, et al., "Adaptive Frequency Hopping for Multiuser OFDM", ICICS, 1999, 5 pages.

The International Bureau of WIPO, "Notification Concerning Transmittal of Internaitonal Preliminary Report on Patentability (Chapter 1 of the Patent Cooperation Treaty" International application No. CT/US2006/027206, received Jan. 31, 2008, 7 pages.

Claims, International application No. PCT/US2006/027206, 6 pages.

* cited by examiner

FIG. 2A

PERFORMANCE LOOKUP TABLE 200

| | CH 1 | CH 2 | CH 3 | CH 4 | ...... | CH n |
|---|---|---|---|---|---|---|
| SLAVE A | 1 | 10 | | 3 | ...... | 2 |
| SLAVE B | | | | | ...... | |
| SLAVE C | 0 | 9 | | 5 | ...... | 4 |
| .... | | | .... | .... | ...... | .... |
| SLAVE nn | 2 | 9 | | 6 | ...... | 8 |

FIG. 2B

CLASSIFICATION LOOKUP TABLE 200

| | CH 1 | CH 2 | CH 3 | CH 4 | ...... | CH n |
|---|---|---|---|---|---|---|
| SLAVE A | NO | YES | | NO | ...... | NO |
| SLAVE B | | | | | ...... | |
| SLAVE C | NO | YES | | YES | ...... | NO |
| .... | | | .... | .... | ...... | .... |
| SLAVE nn | NO | YES | | YES | ...... | YES |

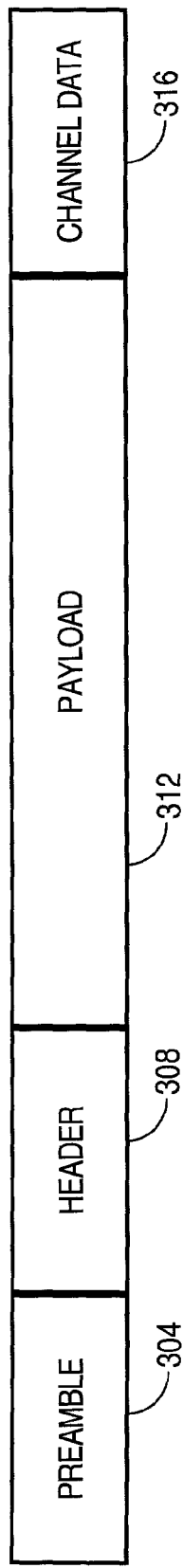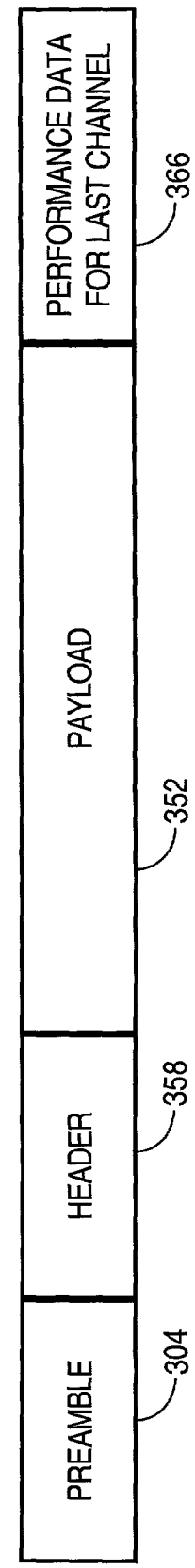
FIG. 3A
FIG. 3B

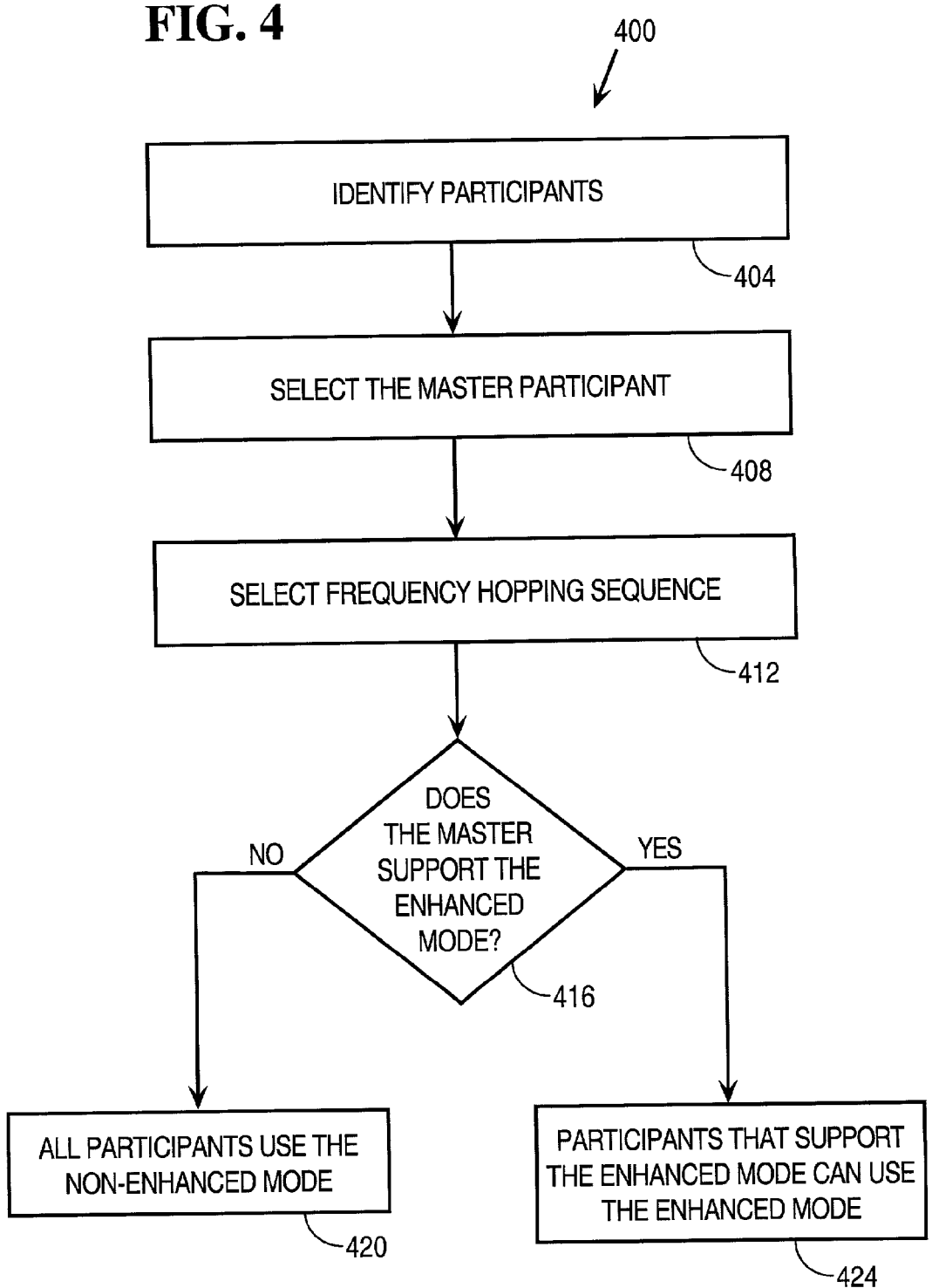

APPROACH FOR MANAGING COMMUNICATIONS CHANNELS BASED ON PERFORMANCE

RELATED APPLICATIONS

This application claims domestic priority from prior U.S. Provisional Patent Application Ser. No. 60/264,345, filed on Jan. 25, 2001, titled "A METHOD FOR NETWORK QUASI-ADAPTIVE FREQUENCY HOPPING MULTICHANNEL UTILIZATION," naming as inventors Bijan Treister, Hongbing Gan, and Efstratios Skafidas, the entire disclosure of which is hereby incorporated by reference for all purposes as if fully set forth herein. This application is related to co-pending U.S. patent application Ser. No. 10/052,019 entitled "APPROACH FOR MANAGING COMMUNICATIONS CHANNELS BASED ON PERFORMANCE AND TRANSFERRING FUNCTIONS BETWEEN PARTICIPANTS IN A COMMUNICATIONS ARRANGEMENT," filed on Jan. 16, 2002, naming as inventors Bijan Treister, Hongbing Gan, and Efstratios Skafidas.

FIELD OF THE INVENTION

The present invention relates to communications systems, and more particularly, to selecting communications channels and participants with which to communicate based on channel performance.

BACKGROUND OF THE INVENTION

A communications network is any system or mechanism that provides for the exchange of information or data between participants. As used herein, the term "participant" refers to any device or mechanism that exchanges data with other devices or mechanisms over a communications medium. In some communications network arrangements, one of the participants is designated as a "master participant." As used herein, the terms "master participant" and "master" are synonymous. The master participant performs one or more functions that are assigned to only the master participant and not to other participants. For example, a master participant may initiate and manage communications with other participants. As another example, the master participant may select a particular frequency hopping scheme to be used in the communications network.

In communications networks with a master participant, the other participants are conventionally referred to as "slave participants." As used herein, the terms "slave participant" and "slave" are synonymous. Communications networks that use a master participant conventionally use only a single master participant, with any number of slave participants. Master participants are typically elected from available slave participants according to a selection or voting algorithm.

A frequency hopping (FH) protocol is an approach for wireless communications in a communications network that uses a frequency hopping signal transmission technique in which information or data is transmitted over a set of frequencies in a communications frequency band. A frequency hopping communications system is a system that uses a FH protocol. The order in which the communications network hops among the set of frequencies is known as the hopping sequence.

In contrast to FH systems, a non-frequency hopping (NFH) system is simply a communications system whose carrier does not hop over a set of frequencies. A typical NFH system may occupy a portion of the communications frequency band corresponding to several frequencies used by an FH system.

With some communications system approaches, such as the FH approach, the frequency band is broken up into separate frequencies, often referred to as "communications channels." As used herein, the terms "communication channel" and "channel" are synonymous. For example, an FH system transmits data on one channel, hops to another channel in the hopping sequence to transmit more data, and continues by transmitting data on subsequent channels in the hopping sequence. The switching of frequencies may occur many times each second. The use of an FH protocol helps to reduce problems with interference from other communications systems and other interference sources. Frequency hopping also helps with fading of transmissions and power consumption and provides security for the transmission so that others may not intercept the data being transmitted because others do not know the hopping sequence.

An example of a frequency hopping protocol is the Institute of Electrical and Electronics Engineers (IEEE) 802.15.1 Wireless Personal Area Network Standard, which is based on the Bluetooth™ wireless personal area network (WPAN) technology from the Bluetooth Special Interest Group (SIG) whose web site is http://www.bluetooth.com/. The BLUETOOTH trademarks are owned by Bluetooth SIG, Inc., U.S.A. The Bluetooth protocol uses 79 individual randomly chosen frequency channels numbered from 0 to 78 and changes the frequencies 1600 times per second. Examples of NFH systems include the IEEE 802.11b Wireless Local Area Network (WLAN) and the IEEE 802.15.3 next-generation WPAN, both of which operate in the 2.4 GHz Industrial, Scientific, Medical (ISM) band, which is an unlicensed portion of the radio spectrum that may be used in most countries by anyone without a license.

Typically, the master of an FH communications system transmits at even-numbered timeslots on the hopping sequence and the slaves listen at those regular intervals. The master will address one slave (or all slaves in a "broadcast" mode), and the addressed slave responds back to the master at the next odd-numbered timeslot. A preamble, which is known to all the participants of the FH network, is used to identify the network and for the slaves to synchronize with the master. For example, in Bluetooth and IEEE 802.15.1, the known preamble is called the "channel access code."

A common problem for communications systems is poor transmission quality of communications channels, also referred to as poor channel performance, which results in data transmission errors. For example, poor channel performance may increase the bit error rate (BER) or result in the loss of packets, leading to reduced transmission quality. As used herein, a "data packet" is a block of data used for transmissions in a packet-switched system, and the terms "data packet" and "packet" are synonymous.

A common source of poor channel performance is interference from other communications systems or other interference sources. Interference has a dynamic nature due to the use of devices at different times and locations, and as a result, eventually all channels of a communication system that uses multiple channels will experience some degree of interference at some time. Interference may change depending on when the communications systems use the band and the relative locations of the participants of each system to participants of other systems. Because the participants may be mobile, interference may vary depending on the movements of the participants of one system relative to the locations of participants of other systems. In addition, interference may arise from other sources resulting in a degradation of performance.

Another common source of poor channel performance is the coexistence problem that may arise between the communications systems that operate in the same frequency band. For example, while an FH communications system hops over the entire frequency band, an NFH communications system occupies separate parts of the frequency band. When the FH communications system hops over part of the frequency band occupied by an NFH communications system, there may be interference between the systems. Although the use of a FH protocol helps to lessen the interference problem because not all of the FH channels will interfere with other communications systems, there nevertheless remains interference on those channels that coincide with the NFH communications systems. An example of the interference situation is the coexistence problem between the frequency hopping IEEE 802.15.1 WPAN and the non-frequency hopping IEEE 802.11b Wireless Local Area Network (WLAN) because both share the 2.4 GHz ISM band.

One approach for managing poor channel performance is to increase the power used in the transmissions such that interference has less of an impact on the system transmitting at the increased power. However, this increased power approach drains batteries used by the participants, and thus the required power increase may be impractical. Also, the increased power approach only benefits the system using the increased power and results in a bigger interference impact on other systems.

Other approaches for managing interference include retransmitting data that had errors in an original transmission and incorporating a form of redundancy into the transmission (e.g., by including multiple copies of some or all of the data) so that the participant receiving the data can identify and correct transmission errors. However, such approaches require additional resources to both identify the errors and then to correct the errors, such as by using additional transmissions or by using redundant data transmission approaches that decrease the amount of information that can be transmitted, which reduces the performance of the communications system.

Based on the need for wireless communications and the limitations in the conventional approaches, an approach for managing poor performance of communications channels that does not suffer from the limitations of the prior approaches is highly desirable.

SUMMARY OF THE INVENTION

According to one aspect of the invention, a method is provided for selecting channels for a communication system. Based on performance of the channels and performance criteria, a communications channel is selected. Channel identification data that identifies the selected channel is generated and provided to a participant, such as by appending the channel identification data to a data packet. A communication is received from the participant over another channel that is selected based on the channel identification data. The other channel may be the selected communications channel, or the other channel may be specified to not be the selected communications channel, or the response channel may be a communications channel immediately following the selected communications channel in a sequence of communications channels, such as a hopping sequence in a frequency hopping system.

According to other aspects of the method, additional channels may be selected and provided to additional participants. The communication that is received from the participant may include a measurement of the performance of the channel used to provide the channel identification data. Channels may be classified based on the performance of the channels, such as by classifying the channels as good or bad, and then the selected channel may be selected from those channels classified as good. If the number of good channels drops below a specified threshold, bad channels may be redeemed to provide a sufficient number of good channels. Performance data may be requested and received from other participants, and performance data may be maintained by a participant, such as by storing the performance data in a lookup table.

According to another aspect of the invention, a method is provided for selecting a particular participant with which to communicate in a communications system. The performance of a communications channel between a specified participant and other participants is determined. Based on the performance and performance criteria, a particular participant is selected, and a communication is sent over the channel to the particular participant.

According to yet another aspect of the invention, a method is provided for using a selected communications channel in a communications system. A communication is received from a participant. The communication includes channel identification data that identifies a channel selected based upon channel performance and performance criteria. Based on the channel identification data, another channel is determined, and another communication is sent to the participant over the other channel. The other communication may include a measurement of the performance of the channel used to receive the channel identification data.

According to another aspect of the invention, a method is provided for maintaining performance data for communications channels between participants. The performance of the channels is determined and performance data is created and maintained by a participant. A request is made for additional performance data from another participant, and revised performance data is created and maintained by the participant. The communications system may use a frequency hopping protocol.

According to yet another aspect of the invention, a communications device includes an interface that is configured to receive data from and transmit data to communications devices and a mechanism communicatively coupled to the interface. The mechanism is configured to select, based on channel performance and performance criteria, a selected communications channel. The mechanism is further configured to generate channel identification data that identifies the selected communications channel and to provide the channel identification data to a communications device. The mechanism is configured to receive a communication from the communications device over another channel that is determined based upon the channel identification data.

According to other aspects, the invention encompasses a computer-readable medium and a carrier wave configured to carry out the foregoing functions.

BRIEF DESCRIPTION OF THE DRAWINGS

Embodiments are illustrated by way of example, and not by way of limitation, in the figures of the accompanying drawings and in which like reference numerals refer to similar elements and in which:

FIG. 2A is a block diagram that depicts a performance lookup table that includes performance data, according to one embodiment of the invention;

FIG. 2B is a block diagram that depicts a classification lookup table that includes channel classification data, according to one embodiment of the invention;

FIG. 3A is a block diagram that depicts a master to slave packet that identifies the selected communications channel, according to one embodiment of the invention;

FIG. 3B is a block diagram that depicts a slave to master packet that includes a performance measurement for a previous communications channel, according to one embodiment of the invention;

FIG. 4 is a flow diagram that depicts an approach for initializing a communications arrangement having a master participant that supports an enhanced mode of selecting communications channels, according to an embodiment of the invention;

DETAILED DESCRIPTION OF THE INVENTION

In the following description, for the purposes of explanation, specific details are set forth in order to provide a thorough understanding of the invention. However, it will be apparent that the invention may be practiced without these specific details. In other instances, well-known structures and devices are depicted in block diagram form in order to avoid unnecessarily obscuring the invention.

In the following description, various embodiments of the invention are described in the following sections:

I. OVERVIEW
II. MEASURING CHANNEL PERFORMANCE, CLASSIFYING CHANNELS, AND STORING RELATED INFORMATION
   A. Approaches for Channel Performance Measurement
   B. Approaches for Channel Classification
   C. Maintaining Channel Performance and Channel Classification Information
III. SELECTING CHANNELS AND INFORMING PARTICIPANTS
IV. NETWORK AND PARTICIPANT INITIALIZATION
V. MASTER CONNECTION SEQUENCE
   A. Normal Packet
   B. Request Table Data Packet
VI. SLAVE CONNECTION SEQUENCE
   A. Initial Handling of Packets
   B. Packet Not Intended for Slave
   C. Normal Packet
   D. Update Table Packet
VII. REDEMPTION OF CHANNELS
VIII. APPROACH FOR MASTER ADAPTIVE SELECTION OF PARTICIPANTS
IX. IMPLEMENTATION MECHANISMS I. Overview A novel approach for managing communications channels generally involves measuring, maintaining, and using channel performance data to manage a communications system. According to one embodiment of the invention, channel performance data is used to select one communications channel from a group of communications channels for use in communicating with a participant of the communications system. According to another embodiment of the invention, channel performance data is used to select one participant from a group of participants to communicate with over a specified communications channel. According to yet another embodiment of the invention, the participants of the communications system maintain and share performance data about the communications channels between the participants.

Figure 1B:
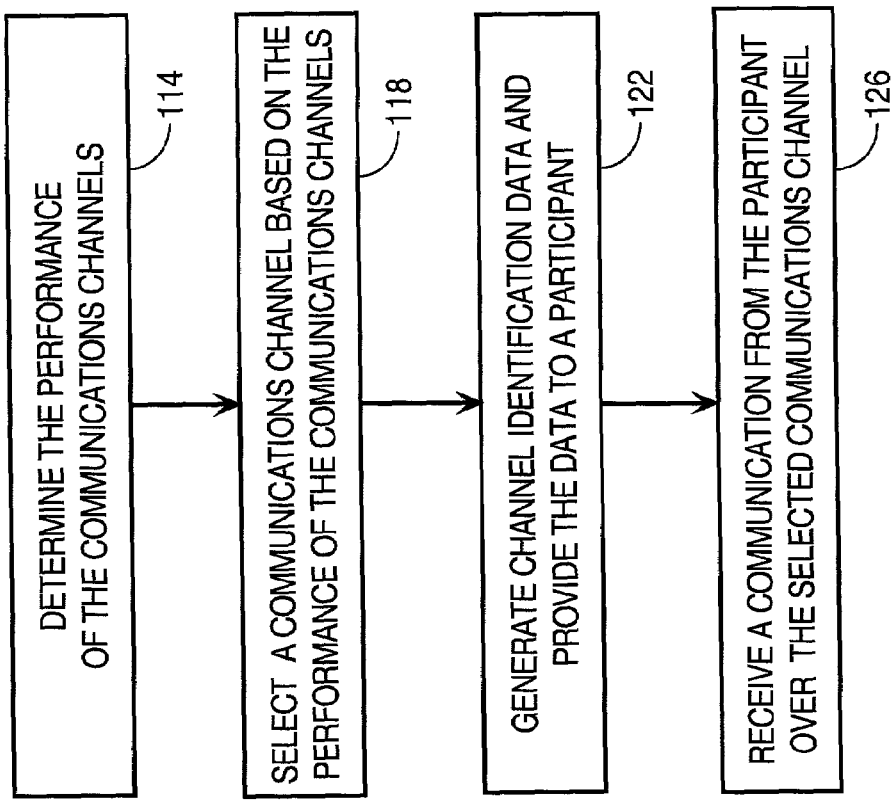
FIG. 1B is a flow diagram that depicts an approach for selecting communications channels based on channel performance, according to an embodiment of the invention.
Figure 1A:
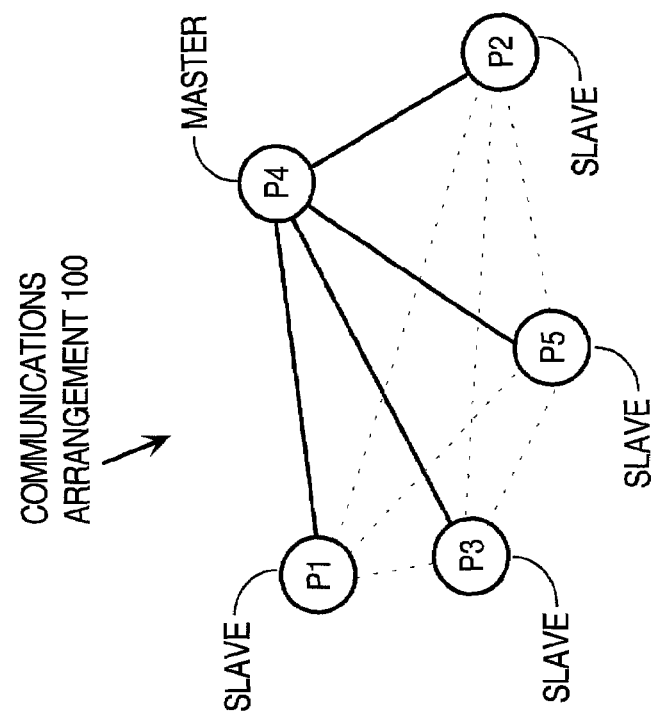
FIG. 1A is a block diagram that depicts a communications arrangement that includes several participants, according to an embodiment of the invention.

FIG. 1A is a block diagram that depicts a communications arrangement 100 that includes participants P1 through P5, according to an embodiment of the invention. In the particular example depicted in FIG. 1A, participant P4 is designated as the master participant and participants P1, P2, P3, and P5 are designated as slaves, although in general, any participant may be designated as the master.

Participants P1 through P5 may be any of a variety of communications devices. Examples of communications devices that may be used in a communications arrangement that uses the channel selection approach described herein include, but are not limited to, wireless devices that are used in wireless local area networks (WLANs) and in wireless personal area networks (WPANs), such as cordless phones, laptop computers, desktop computers, printers, and personal digital assistants (PDAs). Wireless devices may communicate in a variety of ways, including but not limited to, infrared, line of sight, cellular, microwave, satellite, packet radio and spread spectrum technologies. Some communications devices may be characterized as mobile devices based on the relative ease of moving such devices between locations or because the mobile devices may be conveniently carried by a person, such as cordless phones, laptop computers, and PDAs.

In FIG. 1A, master P4 is responsible for performing one or more functions. An example function is initiating and managing communications with participants P1, P2, P3, and P5. Master participant P4 may be elected from participants P1-P5 by participants P1-P5 or another entity. The invention is not limited to any particular approach for designating participant P4 as the master participant.

The solid lines connecting master P4 to slaves P1, P2, P3, and P5 depict the logical connections between the respective participants over which data is communicated between master P4 and a particular slave from slaves P1, P2, P3, and P5. In addition, when master P4 communicates with a particular slave, the other slaves may listen to the communication from master P4 to the particular slave over the logical connections depicted by the solid lines. The dotted lines connecting slaves P1, P2, P3, and P5 to each other depict the logical connections between the respective slaves over which the slaves may listen to replies from the other slaves to master P4. In some communications system, the slaves do not communicate with each other but may listen to communications from other slaves. In other communications systems, slaves may communicate directly with each other. The invention is not limited to a particular configuration of which participants may communicate together or which participants may listen to communications from one another.

FIG. 1B is a flow diagram 110 that depicts an approach for selecting communications channels based on channel performance, according to an embodiment of the invention. In the example depicted by FIG. 1B, a communications channel is selected for use by a participant of a communications arrangement, the participant is told which communications channel to use, and the participant communicates using the selected communications channel. However, in other examples, the participant may be told not to use the selected communications channel, which may be appropriate if the selected communications channel has poor performance, or the participant may be told to skip the selected communications channel and use the next communications channel of a specified sequence of communications channels.

In block 114, the performance of the communications channels of the communication system is determined. For example, for a communications system that uses 90 channels, some or all of the 90 channels may be tested to determine channel performance. The determination of the performance of the communications channels may be performed by a different entity or device than the other functions described in FIG. 1B. In general, the different functions described herein may be performed by different entities or devices.

In block 118, a communications channel is selected based on the performance of the communications channels determined in block 114. One or more performance criteria and one or more selection criteria may be used with the performance information to select the communications channel. For example, a communications system may experience interference on channels 3 through 5 from one communications system and on channels 50 through 54 from another communications system, and the channel testing may indicate a high bit error rate (BER) on those channels.

Channels may be classified by comparing the test results to the performance criteria. For example, the performance criteria may be a specified value, or a specified threshold, that is used to determine whether the channel performance is acceptable or not. As a particular example, if the BER for a channel exceeds the specified threshold, the channel is classified as "good," whereas a channel with a BER that does not exceed the specified threshold is classified as "bad." Other classification approaches may be used, and the invention is not limited to a particular classification approach.

The reason why a bad channel's performance does exceed the specified threshold may be due to a variety of reasons, including but not limited to, the channel being used by another communications system or noise from other interference sources. For example, in a Bluetooth communications system, microwave ovens are a common source of interference.

After classifying the performance of the channels, a communications channel is selected based on the selection criteria. For example, the selection criteria may be to select a good channel but not a bad channel. By using good communications channels, a communications system may avoid interference present on bad channels. Other selection criteria may be chosen to select the channel that provides the best performance among the available channels. Yet other selection criteria may be chosen to randomly select a channel from among the good channels.

Although this example describes the use of a particular type of performance criteria to classify channels and particular selection criteria to select from the classified channels, other approaches may be used to select channels. For example, channels may be selected based on comparing performance results to one or more criteria without first classifying the channels. Also, other criteria may be used, for example, that particular channels are to be selected regardless of the test results because the particular channels are uniformly distributed over the communications band. As another example, a selection criterion may be that particular channels are not to be selected regardless of the test results. Such channels may be previously identified as having a large amount of interference from particular sources, such as another communications system that operates frequently but irregularly. As a result the other system may not be detected during testing and the channels may be selected, although at times there may be significant interference on those channels. Therefore, the selection criteria may specify a list of channels that are not to be selected, even if the channels on the list have satisfactory performance during testing.

In block 122, channel identification data that identifies the communications channel selected in block 118 is generated and provided to a participant of the communications system. For example, in a Bluetooth or IEEE 802.15.1 FH communications system, the master may provide a slave with data that identifies the communications channel that is selected in block 118. The channel data may be appended to a normal, or standard, data packet sent from the master to the slave. Alternatively the channel data may be incorporated into a special packet, such as by including the channel data in the packet header or payload. The master may send the packet to the slave over a communications channel that is determined according to the frequency hopping sequence.

In block 126, a communication is received from the participant over the communications channel that is selected in block 118. For example, in a FH communications system, the communication is a packet that is sent from the slave to the master over the selected communication channel in response to the packet sent from the master to the slave in block 122.

According to one embodiment of the invention, the communication from the participant includes a measurement of the performance of the channel used in sending the packet in block 122. For example, in a FH communications system, the packet from the master to the slave may be used by the slave to measure the performance of the channel used to send the packet to the slave. The performance measurement may be incorporated into the reply packet from the slave to the master. The performance measurement may be stored by the slave, as discussed below.

According to another embodiment of the invention, the communication from the participant is used to generate a measure of the performance of the channel used in sending the communication. For example, in a FH communications system, the packet from a slave to the master may be used by the master to measure the performance of the channel used to send the reply packet to the master, and the performance measurement may be stored by the master, as discussed below.

In the example depicted by FIG. 1B, the selected communications channel is used by the slave to respond to the master. By using channels that are selected based on having acceptable performance, the communications system avoids channels with unacceptable performance. However, the opposite approach may be used to select channels with unacceptable performance and inform participants of the communication system not to use such channels. According to another embodiment of the invention, the communications system may be configured to not use the selected communications channel for transmitting the communication from the participant. For example, the communications channel may be selected because the channel has performance that falls below the specified threshold. Informing the participant that the poor performing channel is not to be used helps to avoid the loss of packets over the selected channel.

Other approaches for using a selected channel may be used. According to yet another embodiment of the invention, the communications system may be configured to skip the selected communications channel and use the next channel in a specified sequence of channels, such as a frequency hopping sequence. Other implementations may combine two or more of the above approaches for using the channel identification data to determine which channel the participant should use. Further, the communications system may be configured to inform a participant of both the selected communications channel and indicate how the selected communications channel is to be used. For example, the channel data may include information indicating whether the selected channel is to be used, not used, or skipped.

A selected communications channel may be provided to more than one participant in a communications system, and the selected communications channel may be used by the participant for more than one communication. However, the repeated use of the same selected communications channel by multiple participants or by a particular participant for multiple communications may not be desirable for many reasons, such as due to changes over time in the performance of the channel. Also, the repeated use of a channel may be inconsistent with the basic approach of many communications system to use different communications channels.

According to another embodiment of the invention, prior to each communication with another participant, the channel selection process is repeated, such that a different channel is typically selected for each communication. For example, prior to communicating to a particular slave, a master may select a communications channel based on the approach illustrated in FIG. 1B. Then prior to the master's next communication, which may be to the same slave or a different slave, the master repeats the channel selection process. Different channels may be selected because the channels differ in performance between the master and the different slaves, because the transient nature of interference has changed the performance of the channels, or because the master randomly selects a particular channel from among the channels having acceptable performance. As a result, the master may choose a different communications channel than that chosen for the previous communication. In general, different packets from the master to the slaves identify different communications channels in the communications system.

According to other aspects of the invention, the master does not include channel data in every packet sent to each slave. For example, some slaves may not support the channel selection approach described herein. Further, the master may not always select a different channel for each slave to use in responding to the master. For example, the communication system may use a specified set of channels, and therefore some channels will be selected more than once.

The determination of channel performance depicted by block 114 may be repeated or updated. For example, channel performance testing may be performed according to a specified schedule, such as the expiration of specified time period, or as a result of monitoring and detecting new interference among the selected set of channels, such as from another communications system that previously did not cause interference. As another example, normal communications between the participants of the communications system may be monitored to determine channel performance.

As a result, the method depicted in FIG. 1B may be used by a communications system to avoid poor quality channels in a quasi-adaptive manner by selecting communications channels with acceptable quality. By using this novel approach to quasi-adaptively select communications channels based on channel performance, interference problems are reduced and transmission performance is improved for both the communications system that selects the communications channels to use and other interfering communications systems. Also, by reducing interference, the power level required to achieve a specified transmission quality is decreased, thereby increasing battery life of mobile devices.

The approach described herein may be characterized as "robust" because interference in a communications system is reduced or eliminated by using channels that have been tested and determined to be "good" because channel performance satisfies a specified threshold. In contrast, channels that have been tested and determined to be "bad" have channel performance that does not satisfy the specified threshold. The approach described herein is a simple scheme that is easy to implement on many devices due to the low computational and memory requirements and is fully interoperable with devices that do not support this novel approach.

Figure 1D:
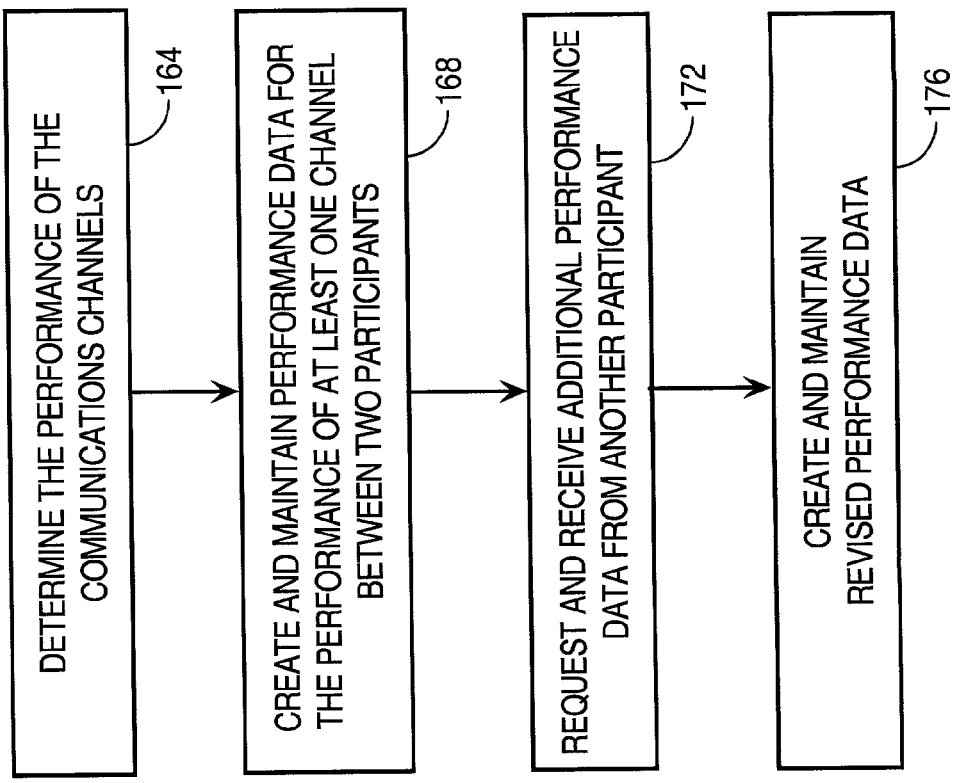
FIG. 1D is a flow diagram that depicts an approach for managing performance data for communications channels between participants of a communications system, according to an embodiment of the invention.
Figure 1C:
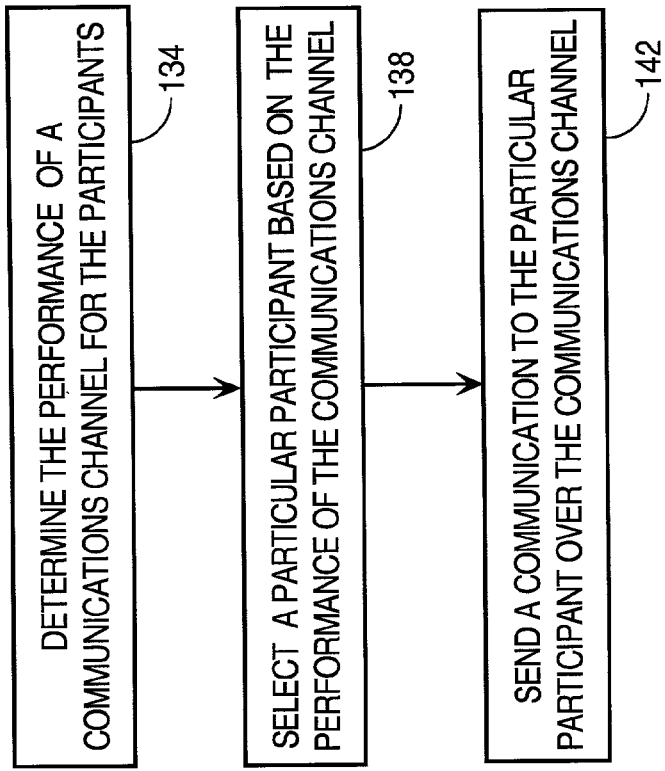
FIG. 1C is a flow diagram that depicts an approach for selecting participants based on channel performance, according to an embodiment of the invention.

FIG. 1C is a flow diagram 130 that depicts an approach for selecting participants with whom to communicate based on channel performance, according to an embodiment of the invention. In block 134, the performance of a communications channel between one participant and one or more of the other participants of the communication system is determined. For example, in a FH communications system, the performance of a particular channel between a master and two or more slaves may be measured.

In block 138, a particular participant of the one or more other participants is selected based on the performance of the communications channel determined in block 134. For example, in a FH communications system, the master may communicate with a set of two or more slaves. The particular communication channel over which the master will communicate with each slave is based on the frequency hopping sequence, and therefore the master is not free to select the communications channel to be used. However, the master may choose which slave of the set of slaves to communicate with over the particular channel based on the performance of that channel between the master and the different slaves.

One or more performance criteria and one or more selection criteria may be used with the performance information to select the participant. For example, in FIG. 1A, communications arrangement 100 may experience interference on channel 17 between master P4 and slaves P1 and P3, but channel

17 may not have an interference problem between master P4 and slaves P2 and P5. The performance of channel 17 may be different for some slaves because interference sources are closer to some slaves than others.

Channels may be classified by comparing the test results to the performance criteria. For example, the performance criteria may be a specified value, or a specified threshold. As a result of the performance testing, channel 17 may be classified as "bad" between master P4 and slaves P1 and P3 and as "good" between master P4 and slaves P2 and P5.

After classifying the performance of the channels, a communications channel is selected based on the selection criteria. For example, the selection criteria may be to select a particular participant for whom the particular channel is a good channel instead of a participant for whom the particular channel is a bad channel. Thus, by selecting a particular participant for whom the communications channel is good, the communications system performing the channel selection may avoid using bad channels resulting in increased throughput for the communications system by minimizing transmission errors and lost packets.

Although this example describes the use of a particular type of performance criteria to classify channels and particular type of selection criteria to select particular participants with whom to communicate, other approaches may be used to select a set of channels. For example, participants may be selected based on comparing performance results to one or more criteria without first classifying the channels. Also, other criteria may be used, such as that particular participants are, or are not, to be selected regardless of the test results, or that the participant with the best performance for the particular channel is to be selected.

In block 142, a communication is sent to the particular participant over the communications channel. For example, in the example above, master P4 may select to send a communication over channel 17 to slave P5 because channel 17 is classified as a good channel between master P4 and slave P5. Master P4 could have selected slave P2 because channel 17 is also classified as a good channel between master P4 and slave P2. However, master P4 would not select slaves P1 or P3 because channel 17 is classified as a bad channel between master P4 and slaves P1 and P3.

FIG. 1D is a flow diagram 160 that depicts an approach for managing performance data for communications channels between participants of a communications system, according to an embodiment of the invention. In block 164, the performance of the communications channels is determined. For example, for a communications system that uses 50 channels, some or all of the 50 channels may be tested to determine channel performance.

In block 168, performance data is created and maintained for the performance of at least one channel between two participants. For example, in a FH communications system, the master may create and maintain performance data for the set of communications channels used by the FH communication system for communications between the master and the slaves. As a more specific example, the master may store the performance data in a lookup table that includes data for some or all of the communications channels between the master and some or all of the slaves of the communications system.

In block 172, additional performance data is requested and received from another participant. For example, a particular slave may create and maintain performance data for the set of communications channels used by the FH communication system for both the communications between the slave and the master and the communications between the slave and other slaves. The master may send a request to the particular slave for the particular slave's performance data. As a more specific example, the particular slave may store the performance data in a lookup table that includes data for some or all of the communications channels between the particular slave and the master, and some or all of the other slaves of the communications system. In response to the request from the master, the particular slave provides the master with some or all of the performance data maintained by the particular slave.

In block 176, revised performance data is created and maintained. For example, the master may combine the performance data received from the particular slave in block 172 with the performance data determined by the master in block 164. Such combined data may reflect the transmission performance from the master to the slaves, from the slaves to the master, and between the slaves. As another example, the master may maintain the requested performance data from the slave separately from the performance data determined in block 164.

In other embodiments, performance data is updated based on performance measurements of normal packets used by the participants of the network. For example, as discussed above, communications from participants may include a measurement of the performance of the communications channel used in sending a previous communication to the participant, and the communications from participants may be used to measure performance of communications channels used by the participants to send the communications. Such performance measurements may be used to revise or update performance data, such as by a master that maintains a lookup table of performance data for the communications channels between the master and the slaves of the communications system.

II. Measuring Channel Performance, Classifying Channels, AND Storing Related Information According to one embodiment of the invention, channel performance is determined using one or more channel performance measurement techniques. For example, any of the techniques for measuring channel performance that are discussed below may be used alone or in combination. Although testing is normally performed on all available communications channels, it is not necessary to test all channels, nor is it necessary to use the same method for testing performance of different channels.

According to other aspects of the invention, channel performance may be determined at an initial time for some or all of the channels, or the channel performance may be initially set at a specified initial value. Channel performance may be retested for some or all of the channels of the communications system, such as at periodic intervals or when a particular condition occurs, such as the detection of new interference. In addition, channel performance may be monitored during normal operation, and the results of the monitoring used to update or replace earlier channel performance determinations. Further, channel performance may be represented by quantitative indications, including but not limited to, scores or other values, and/or by qualitative indications, including but not limited to, low, medium, and high, pass and fail, and whether a packet is lost or not.

According to yet other aspects of the invention, channel performance may be determined both by participants that are the intended recipient of a packet and by participants that "listen" to packets being sent to other participants. For example, in a FH communications system, a master may send a packet to a particular slave, and the particular slave may measure the performance of the channel used by the master to send the packet. However, the other slaves in the communications system may also receive the transmission from the master to the particular slave, even if the transmission was only intended for the particular slave, because the other slaves are listening to the master at the same time. Each slave determines whether it is the intended recipient of the packet, such as by examining the address information in the header of the packet.

Slaves that receive packets intended for another slave may be described as having "listened" to the transmission from the master to the particular slave that is the intended recipient. Only the particular slave for whom the packet is intended is described as being the "recipient" of the packet. Similarly, when a slave sends a reply to a master, other slaves in the communication system may listen for the transmission, and based on the packet received, determine a measurement of channel performance for the channel used to send the reply.

As a result, a particular slave may measure the performance of channels between the particular slave and the master based on both packets sent by the master to the particular slave and packets sent by the master to other slaves. The particular slave may measure the performance of channels between the particular slave and other slaves based on packets that the particular slave listens to and that are sent by the other slaves to the master. Further, the master may measure the performance of channels between the master and each slave based on packets sent by the slaves to the master. Finally, as explained below, the participants of the network may request and receive performance measurements from other participants.

A. Approaches for Channel Performance Measurement

According to one embodiment of the invention, redundancy can be included in the structure of the packets used in the communications system and then used to determine channel performance. For example, a specified pseudo-random sequence may be appended to the header of some or all of the packets used for communications in the system. Because the participants in the communications system know the pseudo-random sequence, the participants can determine the bit error rate (BER) score, or value, based on detected errors in the pseudo-random sequence. By using a common technique, such as the pseudo-random number sequence and determining the BER, the same performance measurement may be used for some or all of the channels of the communications system, which may help to simplify the tracking and combining of performance data.

According to other aspects of the invention, other sequences besides a pseudo-random sequence may be used, including but not limited to, a random sequence, a specified sequence, or any other data that is known to the participants of the communications system. This allows the participants to determine if errors occur in the data and in some situations, the extent or number of errors.

According to another embodiment of the invention, a received signal strength indicator (RSSI) is used to test the performance of communications channels. One approach for determining the RSSI for a channel is to have a master send a NULL packet to a slave. A NULL packet generally includes only an access code and a packet header. NULL packets are often used to ensure that a slave is still synchronized to the communications network.

When a slave receives a NULL packet, the slave does not send a return packet to the master. By listening to the return channel from the synchronized slave, the signal received by the master represents the noise floor of the channel since the slave is not transmitting on the channel. If there is interference, such as from another communications system, the RSSI will be high. Conversely, if there is no interference, the RSSI will be low. According to another aspect of the invention, channel performance is measured on a scale from very low RSSI values to very high RSSI values corresponding to the noise level measured on the channel, thereby providing a range of channel performance measurements.

According to another embodiment of the invention, the known preamble at the start of the packet is used to test the performance of communications channels. For example, identification packets, NULL packets, POLL packets, or any other kind of packet may be used to correlate the received preamble against the known preamble. A packet that does not pass the correlation is discarded (e.g., it is a lost packet). Also, the errors that occur may be used to determine a BER score/value.

According to another embodiment of the invention, a header error check (HEC) is used to test the performance of communications channels. The HEC is a check on the contents of the packet header, such that if an error occurs in the packet header, the packet does not pass the check and the packet is discarded (e.g., it is a lost packet).

According to another embodiment of the invention, a cyclic redundancy check (CRC) is used to test the performance of communications channels. The CRC may be a check of either the payload of the packet or the complete contents of the packet, depending on the communications system protocol being used. As an example, in Bluetooth and IEEE 802.15.1, the data packet must pass a CRC check, otherwise the packet must be retransmitted. A retransmission request (RR) indicates poor channel performance.

According to another embodiment of the invention, forward error correction (FEC) is used for channel performance testing of transmissions between participants of a communications system. FEC may be used on either a packet header or on the payload of the packet. FEC is used as a form of redundant data encoding to allow the recipient to ensure the integrity of the received data and to correct any identified errors. As an example, in Bluetooth or IEEE 802.15.1, the packet header is ⅓ FEC coded, and the payload is ⅔ FEC coded. FEC coding may be used for both an NEB calculation and for error correction.

The descriptions of each channel performance measurement technique above describe the use of the same method for all transmissions, such as master to slave and slave to master transmissions. However, different methods may be used for each direction of transmission, and different methods may be used for different transmissions in the same direction. For example, the RSSI approach may be used for master to slave transmissions while the preamble correlation is used for slave to master transmissions. In addition, different methods may be combined, such that to have a test considered successful, two or more tests must provide an acceptable result. For example, to receive a "pass" indication, a packet may have to pass both the preamble correlation and the HEC tests. Furthermore, the tests used may change over time depending upon the effectiveness of the tests and the requirements of a particular application or implementation. Finally, other approaches that provide an indication of channel performance besides those described herein may be used.

B. Approaches for Channel Classification

According to one embodiment of the invention, a channel is classified based on the measured channel performance and one or more classification criteria. For example, a channel may be classified as "good" or "bad" based on the results of the channel performance testing by applying one or more performance measurements to specified performance criteria as discussed above. As used herein, a good channel's performance satisfies a specified criterion, or a specified threshold, whereas a bad channel's performance does not satisfy the specified criterion or threshold. Although this discussion assumes that all available channels, or all channels that could be used by the communications system, are tested and classified, particular implementations may test and classify fewer than all of the channels. Also, multiple tests for channels may be made and combined, such as by averaging results, to determine a particular performance measurement.

According to another embodiment of the invention, different types of test results may be used and combined. For example, tests that provide NEB results, either numerical or converted to a qualitative scale, may be combined with CRC results of "pass/loss" to arrive at an overall assessment of channel performance. The manner in which such results are combined depends on the particular implementation, and the invention is not limited to any particular approach. For example, different types of test results may be converted to a single type of scale and then combined or averaged to reach a final result. As another example, different test results may be combined using weighting factors that favor some types of tests over others to arrive at a final result.

The conversion of numerical results to qualitative results and the combining of individual tests results to achieve a classification of each channel depends on how competing tradeoffs are to be weighed for a given implementation. For example, high channel performance may be desired, but setting a standard that is too high (e.g., all test results must be "high") may limit the number of channels classified as "good," resulting in few good channels available for use. This is turn may necessitate frequent retesting of the channels when supposedly poor performance is detected. Conversely, setting a standard that is too low allows for a larger pool of channels to be used, but then channels with significant interference are classified as good when in fact channel performance is low and channels are not retested when new interference occurs.

According to another embodiment of the invention, the results of channel performance testing are compared to one or more acceptance criteria. For example, if the testing provides NEB results, an average value may be determined and compared to an acceptance criterion, such as a threshold value. If the testing results exceed the threshold, the channel is classified as "bad", but if the testing results do not exceed the threshold, the channel is classified as "good." As another example, the correlation approach, HEC, and CRC may all be used to determine whether a packet is lost or not (e.g., whether an error occurs as a result of the transmission of the packet) and the packet loss ratio determined and compare to a threshold value. For example, assuming that a threshold of 20% is established, the loss of more than 10 packets out of 50 would result in the channel being classified as bad, whereas losing 10 or fewer packets would result in the channel being classified as good.

C. Maintaining Channel Performance and Channel Classification Information

According to one embodiment of the invention, channel performance information is maintained by one or more participants of the communications system. For example, in a FH communications system, a master may maintain channel performance data for each channel and for each slave in the system. However, other implementations and communications systems may maintain data on fewer than all of the available channels and for fewer than all of the other participants in the system, and other participants besides a master participant may maintain performance data.

FIG. 2A is a block diagram that depicts a performance lookup table 200 that includes channel performance data, according to one embodiment of the invention. The example performance lookup table depicted in FIG. 2A includes a row for slaves A, B, C, . . . , nn and column for channels 1, 2, 3, 4, . . . , n, although any number of slaves and channels may be included and different organizations of the information may be used besides that depicted in FIG. 2A. The performance data included in performance lookup table 200 is in the form of quantitative measurements that are on a scale of 0 to 10 with 0 being the lowest score (i.e., relatively poor channel performance) and 10 the highest score (i.e., relatively good channel performance). However, other scales for quantitative measurements may be used as well as qualitative measurements.

Data in a performance lookup table may be missing for a particular channel or slave. For example, performance lookup table 200 does not include data for slave B or for channel 3. Measurements for a particular slave or a particular channel may not be included for a variety of reasons. For example, a particular slave may be omitted or not have any data because the slave does not support the channel selection or participant selection approaches described herein. As another example, a particular channel may be omitted or not have any data because the particular channel was determined to be bad at the initialization of the communication system and therefore is not used by the system. As yet another example, in a FH communications system, the frequency hopping sequence may use fewer than all of potential channels that are potentially available, and the selected frequency hopping sequence may not include the particular channel, such as when the particular channel is not needed or when the particular channel is determined to have unacceptable performance.

According to another embodiment of the invention, one or more participants of a communications system may maintain a performance lookup table that may include data for some or all of the channels between the participant and some or all of the other participants of the communications system. For example, in a FH communications system, the master typically maintains a performance lookup table, and some or all of the slaves may also maintain performance lookup tables.

According to one embodiment of the invention, channel classification information is maintained by one or more participants of the communications system. For example, in a FH communications system, a master may maintain channel classification data for each channel and for each slave in the system. The master may maintain the data by storing data locally or at a separate location. However, other implementations and communications systems may maintain data on fewer than all of the available channels and for fewer than all of the other participants in the system, and other participants besides a master participant may store classification data.

FIG. 2B is a block diagram that depicts a classification lookup table 250 that includes channel classification data, according to one embodiment of the invention. The example performance lookup table depicted in FIG. 2B includes a row for slaves A, B, C, . . . , nn and column for channels 1, 2, 3, 4, . . . , n, although any number of slaves and channels may be included and different organizations of the information may be used besides that depicted in FIG. 2B. The classification data given in performance lookup table 200 is in the form of a usability classification approach in which a useable channel is identified by "YES" and an unusable channel is identified by "NO." Other classification approaches may be used, such as classifying channels as good or bad or as useable and unusable, and the invention is not limited to a particular classification approach.

Data in a classification lookup table may be missing for a particular channel or slave. For example, classification lookup table 250 does not include data for slave B or for channel 3. Measurements for a particular slave or a particular channel may not be included for a variety of reasons, including those described above with reference to channel performance data and performance lookup table 200 of FIG. 2A.

According to another embodiment of the invention, one or more participants of a communications system may maintain a classification lookup table that may include data for some or all of the channels between the participant and some or all of the other participants of the communications system. For example, in a FH communications system, the master typically has a classification lookup table, and some or all of the slaves may have classification lookup tables.

In a particular communication system, a participant may maintain a performance lookup table, a classification lookup table, both types of lookup tables, or a lookup table that includes both performance and classification data. For example, a particular implementation of a communications network may be configured to use performance lookup tables, and channels are classified as needed based on comparing the performance data to one or more performance criteria. Storing performance data provides more information about the performance of the communications system, but may require additional storage space. Other implementations may be configured to use classification lookup tables, which may minimize storage requirements because the data need only include data indicating the whether a channel is good or bad instead of a variety of potential performance measurements. However, less information is available about the performance of each channel for each participant.

Although embodiments of the invention are described herein in the context of maintaining channel performance and classification data in lookup tables, channel performance and classification data may be maintained in any form, including but not limited to, other types of tables besides lookup tables or a database.

III. Selecting Channels and Informing Participants

According to one embodiment of the invention, a participant selects a communications channel and identifies the selected communications channel to another participant by using channel identification data. For example, the performance data, such as in a performance lookup table, or the classification data, such as in a classification lookup table, may be used to select a communications channel based on one or more selection criteria. As a particular example, the classification lookup table may classify each channel as either good or bad, and the channel is selected from the good channels that are available between the participant making the selection and the other participant that will use the selected channel to determine on which channel to send a reply.

FIG. 3A is a block diagram that depicts a master to slave packet 300 that identifies the selected communications channel, according to one embodiment of the invention. While the packet example depicted in FIG. 3A is presented as being from a master to a slave, in general such a packet may be transmitted from any participant to another participant, and the invention is not limited to a particular manner of making transmissions.

Master to slave packet 300 is transmitted by the master to a particular slave. Master to slave packet 300 includes a preamble 304, a header 308, a payload 312, and channel data 316. Master to slave packet 300 may be used in a Bluetooth or an IEEE 802.15.1 FH communications system. Preamble 304, header 308, and payload 312 may be the portions of a normal, or standard, packet for the particular communications system, and channel data 316 may be appended, or "piggybacked", onto the normal packet. Therefore, a special packet is not required to provide channel data 316 from the master to a slave. However, in other implementations and other communications systems, channel data 316 may be incorporated into other parts of a normal packet, or a special packet may be used, which incorporates channel data 316.

Preamble 304 is used to identify the FH communications system and for the slaves to synchronize with the master. Preamble 304 is a binary string whose length depends on the communications protocol. For example, for a Bluetooth based FH communications system, known preamble 304 is 72 bits in length.

Header 308 includes control information, such as the origination and destination address of the packet, the type of packet, and the priority level for the packet.

Payload 312 includes the contents or data being carried by master to slave packet 300, as compared to the control information, or overhead, of header 308.

Channel data 316 identifies the selected communications channel. For example, in a Bluetooth based FH communications system, a master may select channel 42 based on a performance data lookup table, such as by identifying the selected communications channel based on selection criteria and the performance data for the channels between the master and the particular slave to which master to slave packet 300 is to be sent.

When a slave receives master to slave packet 300 that includes channel data 316, the slave may determine the particular communication channel on which to respond, hereinafter referred to as the response communications channel, by using one or more of a number of approaches. For example, the selected channel that is identified by channel data 316 may be treated by the slave as the communications channel on which the slave is to respond to the master. As another example, the selected channel that is identified by channel data 316 may be treated by the slave as a communications channel that the slave is not to use when responding. As yet another example, the selected channel that is identified by channel data 316 may be treated by the slave as a communications channel that the slave is to skip in a sequence of channels, such as a frequency hopping sequence, and thus the slave moves onto the next channel in the sequence instead of using the selected communications channel.

According to another aspect of the invention, channel data 316 may include a redundancy technique, such as being ⅓ FEC encoded, to help the slave that receives channel data 316 to properly understand channel data 316 even if errors occur during the transmission.

According to another embodiment of the invention, a participant responds on a particular communications channel that is determined based on a selected communications channel, and the participant provides as part of the response a measurement of the performance of the previous communications channel used for the previous transmission to the participant, and the transmission is not limited to a particular manner of making transmissions.

FIG. 3B is a block diagram that depicts a slave to master packet 350 that includes a performance measurement for a previous communications channel, according to one embodiment of the invention. While the packet example depicted in FIG. 3B is presented as being from a slave to a master, in general such a packet may be transmitted from any participant to another participant.

Slave to master packet 350 is transmitted by the slave to the master in response to master to slave packet 300 that the master transmitted to the slave. Slave to master packet 350 includes preamble 304, a header 358, a payload 352, and performance data for last channel 366. Master to slave packet 300 may be for a Bluetooth or an IEEE 802.15.1 FH communications system. Preamble 304, header 318, and payload 352 may be the portions of a normal, or standard, packet for the particular communications system, but with performance data for last channel 366 incorporated into the normal packet after payload 352. However, in other implementations and other communications systems, performance data for last channel 366 may be incorporated into other parts of a normal packet, such as between header 358 and payload 352, or included in a special packet.

Preamble 304 in slave to master packet 350 is the same as preamble 304 in master to slave packet 300 because in this example, both packets are used in the same communications system and therefore both packets use the same preamble 304 for identification of the communications system.

Header 358 includes control information, such as the origination and destination address of the packet, the type of packet, and the priority level for the packet. The contents of header 358 are typically different from the contents of header 308 because the control information is different between slave to master packet 350 and master to slave packet 300 (e.g., the origination and destination addresses are different).

Payload 352 includes the contents or data being carried by slave to master packet 350, as compared to the control information, or overhead, of header 358.

Performance data for last channel 366 is data that indicates a performance measurement of the channel used by the master to send master to slave packet 300 to the slave. For example, the slave may use one of the channel performance measurement techniques discussed above to determine a score for the transmission of master to slave packet 300, such as a BER score or an RSSI value. By including performance data in the reply packet from the slave to the master, the master may obtain performance data on other channels and on the master to slave transmission direction in addition to performance data on the channels used by slaves to communicate with the master and on communications in the master to slave direction. According to another embodiment of the invention, the slave provides a channel classification instead of a channel performance measurement.

IV. Network and Participant Initialization

Communications systems conventionally perform an initialization procedure to identify and/or locate the participants and to elect a master participant. FIG. 4 is a flow diagram 400 that depicts an approach for initializing a communications arrangement having a master participant, according to an embodiment of the invention. For purposes of explanation, embodiments of the invention are described hereinafter in the context of exchanging data between participants using packets. Any type of packet may be used and the invention is not limited to any particular packet. For example, the packets may include a preamble, header, payload and tail, alone or in any combination. Furthermore, embodiments of the invention are described in the context of frequency hopping where successive data packets are transmitted on different frequency channels and each participant transmits in an assigned time slot, although the invention is not limited to the frequency hopping context.

In block 204, participants are identified, such as participants P1 through P5 in FIG. 1A. For example, in a Bluetooth FH communications system, a connection is established between two participants, and then other participants join the communications system. The first two devices may find each other in a variety of ways. For example, one participant may continually scan one channel for a specified amount of time while the other participant transmits a specified sequence on each available channel. After each transmission on a channel, the other device listens for a specified amount of time for a reply. When both participants are on the same channel, the first device "hears" the other device and replies with a transmission on the same channel. Negotiation for a link between the two participants may then be performed. The additional participants may join the communications system via the same procedure, although the communications system may be put on hold while another participant is added.

In block 408, a master participant is selected according to a specified selection algorithm. In the present example, participant P4 is selected as the master participant, either by all of participants P1-P5, by the other participants P1-P3 and P5, or by some other mechanism or process involved in the management of communications arrangement 100. For example, in the example above, the participant transmitting the predefined sequence may be specified as the default master, although the default may be changed by the specified selection algorithm.

In block 412, a frequency hopping sequence is selected, provided that the communications system uses a frequency hopping protocol. The invention is not limited to any particular frequency hopping sequence or approach for selecting the frequency hopping sequence, nor to a communications system that uses a frequency hopping sequence to select which channels to use out of a set of channels.

In block 416, a determination is made whether the master supports the enhanced mode of selecting a channel based on channel performance, according to an embodiment of the invention. If not, the approach continues to block 420 that indicates that all the participants of the communications system use the normal, or non-enhanced, mode because the master does not support the enhanced mode (even if some or all the other participants support the enhanced mode). In the non-enhanced mode, channels are not selected based on channel performance as described herein.

However, if in block 416 the master is determined to be able to support the enhanced mode of selecting a channel based on channel performance, the approach continues to block 424 that indicates that the participants that support the enhanced mode can use the enhanced mode. Note that not all participants are required to support the enhanced mode, so that if some participants, such as some legacy devices acting as slaves, do not support the enhanced mode, communications may continue to be carried out according to the non-enhanced mode for communications with those participants. Once communications arrangement 100 has been initialized, master P4 begins performing its assigned functions. Slaves P1, P2, P3, and P5 perform functions as instructed by master P4 and communicate with master P4.

According to one embodiment of the invention, participants that maintain data indicating the performance and/or classification of channels may reset the stored data when the communications system is initialized. For example, if a participant, such as a master or a slave, has a classification lookup table that indicates whether each channel between the participant and the other participants is either good or bad, the entries in the lookup table may be reset to good. Such a resetting approach may be useful in communications systems that are configured to reclassify channels as bad when unacceptable performance measurements are determined. As time passes, more channels are reclassified as bad due to the transient nature of interference and other sources of poor channel performance, which limits the number of good channels that are available. However, some channels that are previously determined to be bad may no longer have poor channel performance, such as when the source of the interference is no longer present or otherwise changes. Therefore, by resetting the lookup tables at initialization, the number of potentially good channels available is increased and previously bad channels that are no longer subject to poor performance may be used again.

V. Master Connection Sequence

Example functions performed by a master are now described with reference to flow diagrams 500 and 550 of FIGS. 5A and 5B, respectively. The two example functions described hereinafter are sending a normal packet to a slave and requesting that slave send the slave's lookup table data to the master. While the examples below use a master and one or more slaves, a network with any types of participants, including but not limited to masters and slaves, may employ the approaches described therein. Also, while the examples herein include storing classification data in lookup tables, other approaches for maintaining data may be used, and the invention is not limited to a particular approach.

A. Normal Packet

Figure 5A:
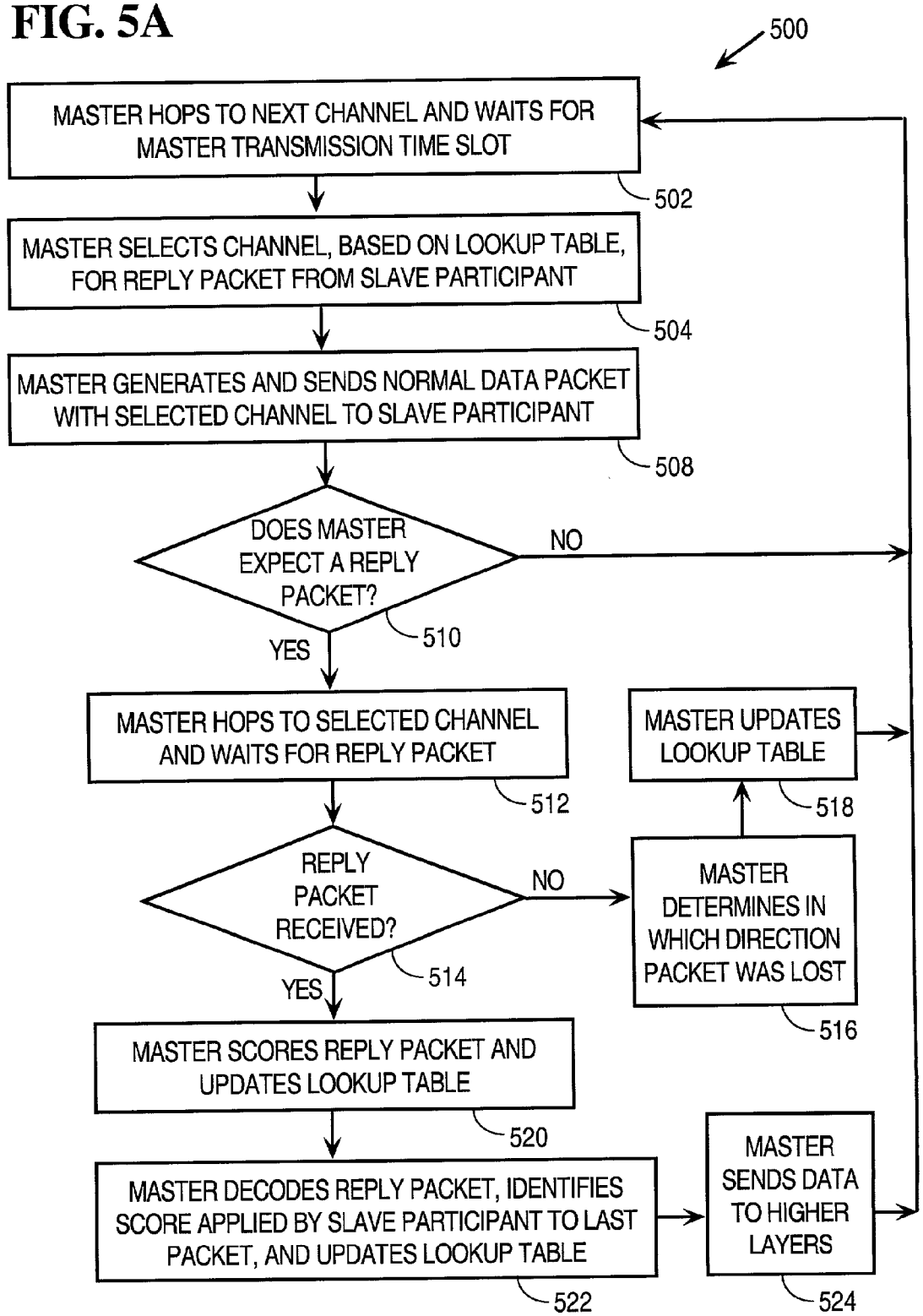
FIG. 5A is a flow diagram that depicts an approach for a master to send a normal packet to a slave, according to an embodiment of the invention.

FIG. 5A is a flow diagram 500 that depicts an approach for a master to send a normal packet to a slave, according to an embodiment of the invention. While FIG. 5A describes the transmission of a normal packet between a master and a slave, other participants may employ a similar approach for sending packets. Also, while FIG. 5A depicts a certain set of steps arranged in a particular order, the invention is not limited to the particular steps and order shown, and additional or fewer steps and other orderings of steps may be used in other implementations and communications systems.

In block 502, the master hops to the next channel and waits for the master transmission time slot. As is conventional in time division multiple access protocols, each participant communicates during a particular period of time referred to as a time slot.

In block 504, the master selects a communications channel to be used by the slave in sending a reply packet. The communications channel is selected based on the lookup table that includes channel classifications. For example, the master may select the communications channel from among the channels between the master and the slave that are classified as good. However, in other implementations, the master may maintain a performance data lookup table and select the channel from among those channels having a score above a specified threshold. In general, any type of selection criteria may be used, including but not limited to, selecting the channel with the highest score.

While the example of FIG. 5A has the slave using the selected channel for replying to the master, in general, the slave may use the selected communications channel in a number of ways, including but not limited to, avoiding the use of the selected communications channel or skipping the selected communications channel in a sequence of channels used by the communications system. Also, the master may use a lookup table that has performance data instead of classification data, or both types of data, or even another source of stored data that reflects the performance of the communications channels.

In block 508, the master generates and sends a normal packet to a slave participant. For example, the master may use master to slave packet 300.

In block 510, a determination is made whether the master expects a reply packet from the slave participant. If not, such as when the master sends a NULL packet, then the process returns to block 502. If the master participant does expect a reply packet from the slave participant, then in block 512, the master hops to the selected channel and waits to receive the reply packet from the slave participant. For example, the slave may reply by sending slave to master packet 350.

If, in block 514, the reply packet is received from the slave participant, then the process continues to block 520, which is discussed below. However, if in block 514, the reply packet is not received, e.g., within a specified period of time, then in block 516, the master determines in which direction the packet was lost. For example, the packet sent from the master to the slave may have been lost, the reply packet from the slave to the master may have been lost, or both packets may have been lost.

One approach for determining in which direction the packet was lost is to measure the RSSI on the channel that the slave was to use for the reply packet. A high RSSI may indicate that there is interference on the channel and therefore that the reply packet was lost from the slave to the master. Conversely, a low RSSI may indicate that there is no interference on the channel and therefore that the packet from the master to the slave was lost. However, due to the transient nature of interference, in some situations, a conclusive determination may not be possible because the interference may not be the same when the RSSI is measured as when the packets are transmitted.

In block 518, the master updates the master's lookup table to reflect that a reply packet was not received from the slave participant. For example, if the master maintains a classification data lookup table, the master may change the classification of the selected channel from good to bad. From block 518, the process returns to block 502.

Returning to block 520, the master scores the reply packet and updates the master's lookup table to reflect the score. For example, the master may use a channel performance measurement technique, such as those discussed above, to determine a BER score or an RSSI value based on the reply packet.

In block 522, the master decodes the reply packet, identifies the score applied by the slave participant to the last packet sent from the master to the slave, and updates the master's lookup table to reflect the score from the slave. For example, the reply packet may be slave to master packet 350 that includes performance data for last channel 366 that measures the performance of the channel used to send master to slave packet 300.

In block 524, the master sends data to higher layers as appropriate. The reply packet may include data that is to be processed by a higher layer in the master participant device. One example of such data is performance data from the slave participant that indicates the quality of transmission from the master participant to the slave participant. From block 524, the process returns to block 502.

B. Request Table Data Packet

Figure 5B:
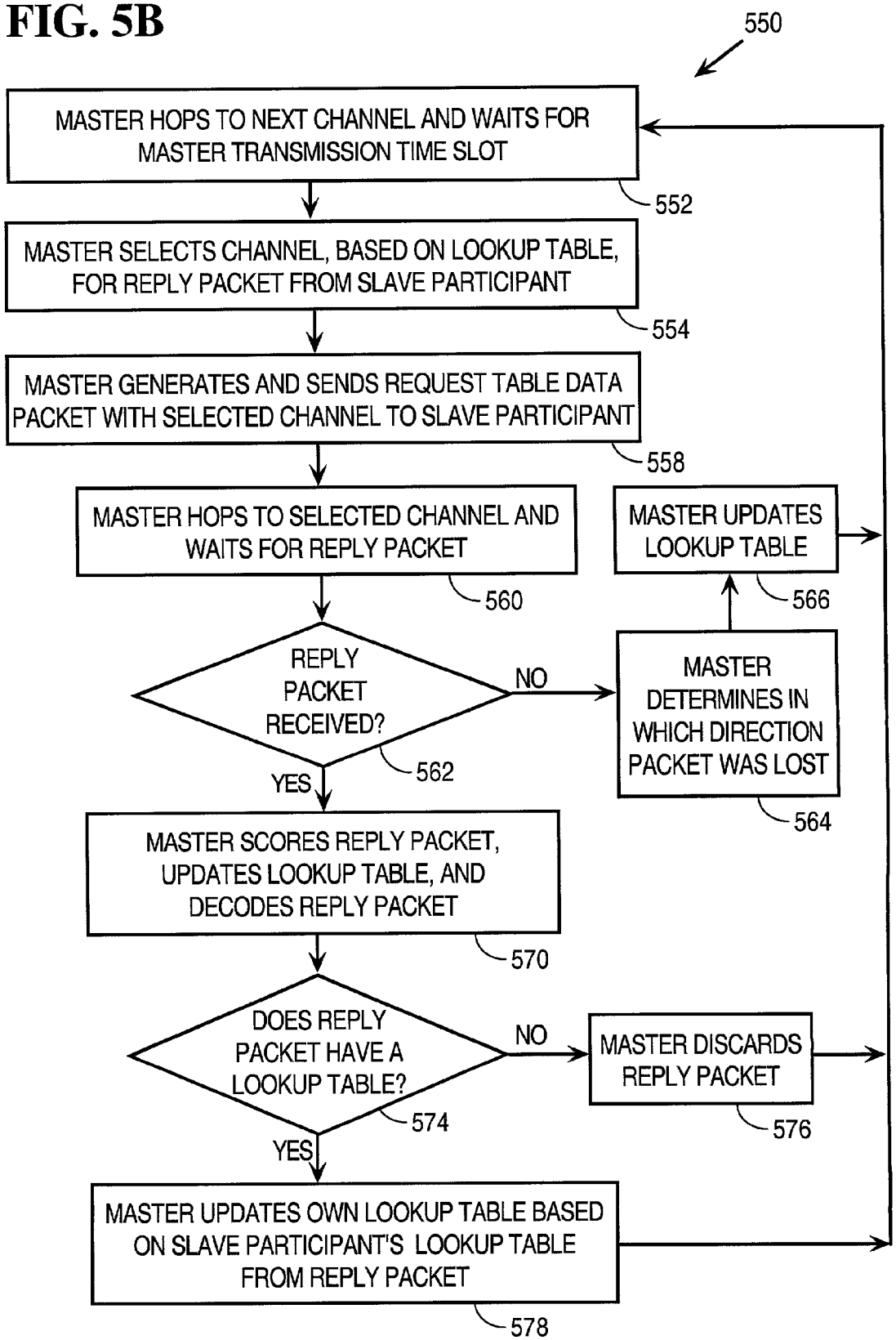
FIG. 5B is a flow diagram that depicts an approach for a master to send a request table data packet to a slave, according to an embodiment of the invention.

FIG. 5B is a flow diagram 550 that depicts an approach for a master to send a request table data packet to a slave, according to an embodiment of the invention. While FIG. 5B describes the transmission of a request table data packet between a master and a slave, other participants may employ a similar approach for sharing performance data. Also, while FIG. 5B depicts a certain set of steps arranged in a particular order, the invention is not limited to the particular steps and order shown, and additional or fewer steps and other orderings of steps may be used in other implementations and communications systems.

In block 552, the master hops to the next channel and waits for the master transmission time slot.

In block 554, the master selects a communications channel to be used by the slave in sending a reply packet. The communications channel is selected based on the lookup table that includes channel classifications. For example, the master may select the communications channel from among the channels between the master and the slave that are classified as good.

However, in other implementations, the master may maintain a performance data lookup table and select the channel from among those channels having a score above a specified threshold value. In general, any type of selection criteria may be used, including but not limited to, selecting the channel with the highest score.

While the example of FIG. 5B has the slave using the selected channel for replying to the master, in general, the slave may use the selected communications channel in a number of ways, including but not limited to, avoiding the use of the selected communications channel or skipping the selected communications channel in a sequence of channels used by the communications system. Also, the master may use a lookup table that has performance data instead of classification data, or both types of data, or even another source of data that reflects the performance of the communications channels.

In block 558, the master generates and sends a request table data packet to a slave participant. For example, the request table data packet may identify one or more channels between one or more participants and request that the slave provide the performance and/or classification data that the slave has on the identified channels for the identified participants. As another example, the request table data packet may request that the slave provide all of the data that the slave has in the slave's lookup table or tables.

In block 560, the master hops to the selected channel and waits to receive the reply packet from the slave participant.

If, in block 562, the reply packet is received from the slave participant, then the process continues to block 570, which is discussed below. However, if in block 562, the reply packet is not received, e.g., within a specified period of time, then in block 564, the master determines in which direction the packet was lost as discussed above in reference to block 516 of FIG. 5A.

In block 566, the master updates the master's lookup table to reflect that a reply packet was not received from the slave participant. For example, if the master maintains a classification data lookup table, the master may change the classification of the selected channel from good to bad. From block 566, the process returns to block 552.

Returning to block 570, the master scores the reply packet, updates the master's lookup table to reflect the score, and decodes the reply packet. For example, the master may use a channel performance measurement technique, such as those discussed above, to determine a BER score or an RSSI value based on the reply packet.

In block 574, the master determines whether the reply packet has a lookup table. If not, then the process continues to block 576 where the master discards the reply packet, and then the process returns to block 552. However, if the reply packet includes a lookup table, or whatever data was requested by the master from the slave, the process continues on to block 578.

In block 578 the master updates the master's own lookup table based on the lookup table information included in the reply packet from the slave. For example, the master may average scores in the master's performance lookup table with those from the slave, or the master may update the master's classification lookup table to change the master's classification of good channels to bad based on whether the channels are classified as bad in the slave's classification lookup table. From block 578, the process returns to block 552.

VI. Slave Connection Sequence

Example functions performed by a slave are now described with reference to flow diagrams 600, 630, 650 and 670 of FIGS. 6A, 6B, 6C, and 6D, respectively. The four example functions described hereinafter are the initial handling by a slave of a packet sent by a master, the handling a packet not intended for a slave, receiving a normal data packet from a master, and sending an update table packet to a master in response to a request table packet. While the examples below use a master and one or more slaves, a network with any type of participant, including but not limited to masters and slaves, may employ the approaches described therein, and the invention is not limited to a particular approach.

A. Initial Handling of Packets

Figure 6A:
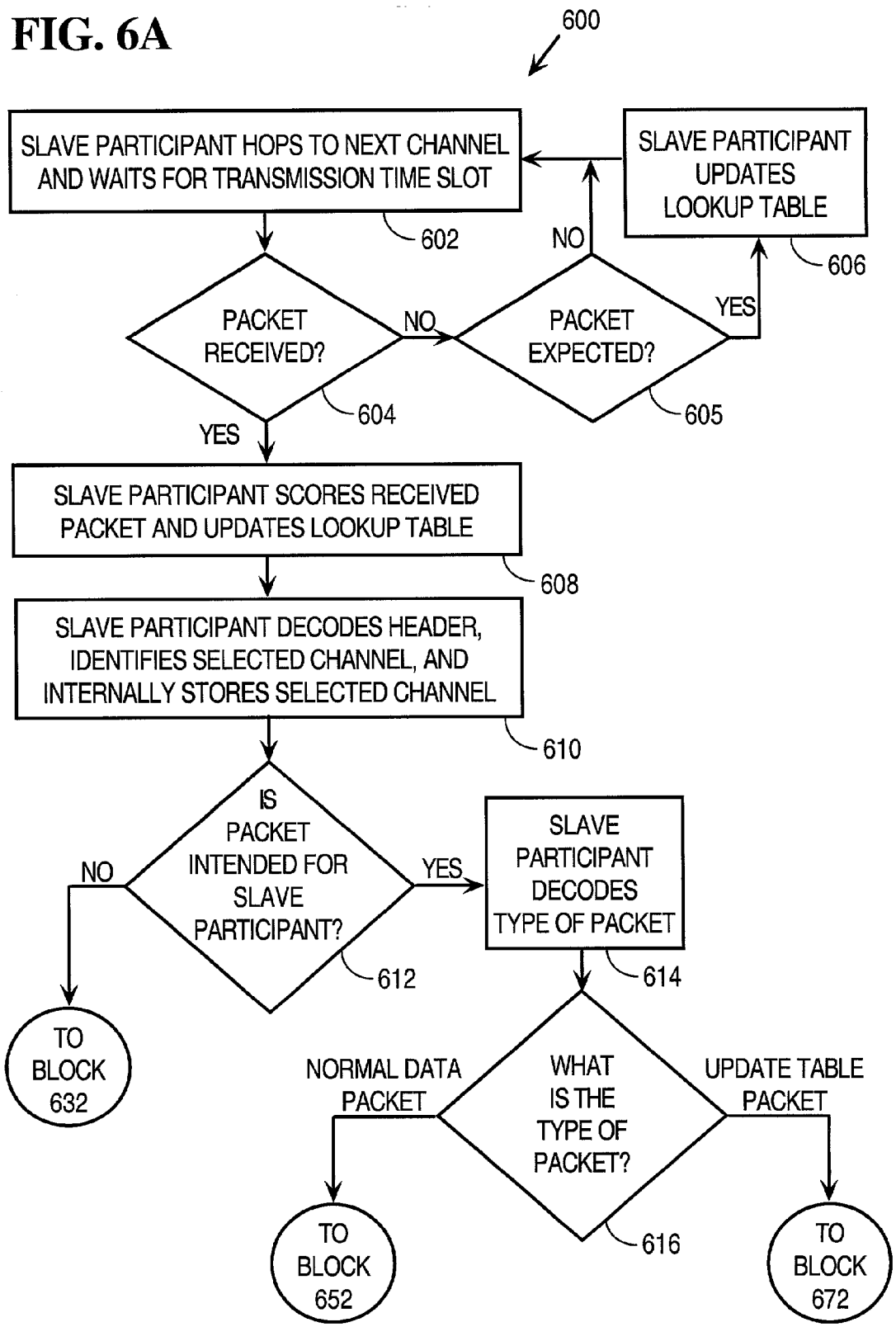
FIG. 6A is a flow diagram that depicts how a slave initially handles packets that the slave receives from other participants, according to an embodiment of the invention.

FIG. 6A is a flow diagram 600 that depicts how a slave initially handles packets that the slave receives from other participants, according to an embodiment of the invention. While FIG. 6A describes the transmission of packets as being between a master and a slave, other participants may employ a similar approach for transmitting data. Also, while FIG. 6A depicts a certain set of steps arranged in a particular order, the invention is not limited to the particular steps and order shown, and additional or fewer steps and other orderings of steps may be used in other implementations and communications systems.

In block 602, the slave participant hops to the next channel and waits for the slave's assigned transmission time slot. The next channel may be determined according to a particular frequency hopping scheme employed for the communications system. Once the assigned time slot has arrived, the slave participant attempts to detect an incoming packet from a master participant.

In block 604, a determination is made whether a packet has been received. If so, then the process continues to block 608, as discussed below. If not, then the process continues to block 605, where a determination is made whether a packet was expected. In some communications systems, the master is expected to make a transmission at each time slot assigned to the master, whereas in other communications systems, transmissions are not made at every time slot. If a packet was not expected, the process returns to block 602. If a packet was expected and yet not received, the process continues to block 606 where the slave participant updates the slave's lookup table to reflect that a packet was not received, and the process returns to block 602. The slave participant conventionally repeats blocks 602, et seq. as described above, until a packet is detected from the master.

If in block 604, the slave participant detects a packet from the master, the process proceeds to block 608, where the slave participant scores the packet received from the master and updates the slave's lookup table to reflect the score. For example, the slave may use a channel performance measurement technique, such as those discussed above, to determine a BER score or an RSSI value based on the received packet.

In block 610, the slave participant decodes the header of the received packet, identifies the selected channel, and maintains information about the selected channel, such as by internally storing the selected channel. For example, the received packet may be similar to master to slave packet 300 with channel data 316 appended to the packet, which identifies the channel selected by the master, such as by following the approach of FIG. 1B. By storing the selected channel internally, the slave participant can later retrieve the selected channel. Because other implementations may use channel data 316 to specify a channel that is to be used differently, such as a channel that is not to be used or as another channel to be skipped, the slave may perform some processing or analysis based on channel data 316 to determine what data is to be maintained.

In block 612, a determination is made whether the packet is intended for the slave participant. For example, the header that is decoded in block 610 typically includes information that identifies the intended recipient of the packet. If the slave participant is not the intended recipient, the process continues to block 632 that is described below with reference to FIG. 6B.

If the slave participant is the intended recipient of the packet received in block 604, the process continues to block 614 where the slave participant decodes the type of packet that has been received. In block 616, if the type of packet is determined to be a normal data packet, the process continues to block 652 that is described below with reference to FIG. 6C, and if the type of packet is determined to be an updated table packet, then the process continues to block 672 that is described below with reference to FIG. 6D.

B. Packet Not Intended for Slave

Figure 6B:
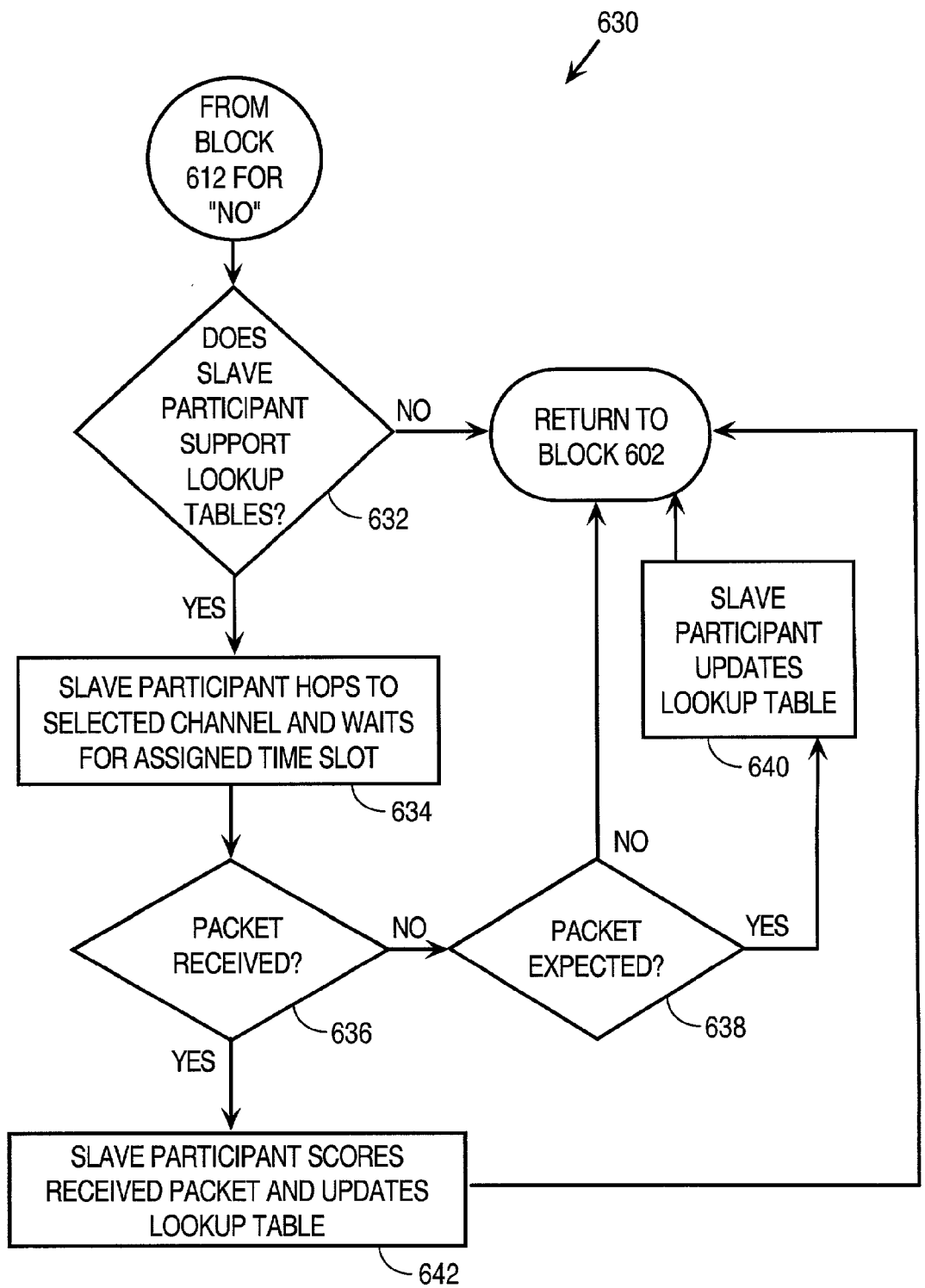
FIG. 6B is a flow diagram that depicts how a slave handles a packet that is not intended for the slave, according to an embodiment of the invention.

FIG. 6B is a flow diagram 630 that depicts how a slave handles a packet that is not intended for the slave, according to an embodiment of the invention. While the slave does not respond to a packet that is not intended for the slave, the slave may nevertheless listen to the reply packet from the slave for whom the packet is intended. As a result, the slave may use the reply transmission to determine the performance of the channel used for the reply between the responding slave and the current slave. Thus, the slave may include performance and/or classification data not only on channels between the slave and the master, but also between the slave and other slaves in the communications system. Whether the slave updates performance and/or classification data by default depends on the particular implementation, and therefore some implementations may not employ the approach described with respect to FIG. 6B.

While FIG. 6B describes the transmission of packets as being between a master and a slave, other participants may employ a similar approach for handling packets not intended for the participant that receives the packet. Also, while FIG. 6B depicts a certain set of steps arranged in a particular order, the invention is not limited to the particular steps and order shown, and additional or fewer steps and other orderings of steps may be used in other implementations and communications systems.

Block 632 is reached from block 612 when the packet is determined to not be intended for the slave participant. In block 632, a determination is made whether the slave participant supports the use of lookup tables, or other approaches for maintaining channel performance or classification information. If not, the process returns to block 602 of FIG. 6A. If so, the process continues to block 634.

In block 634, the slave participant hops to the selected channel and waits for the slave's assigned transmission time slot. For example, the selected channel may be the selected channel that is identified by channel data 316 in block 610.

In block 636, a determination is made whether a packet has been received. If so, then the process continues to block 642, as discussed below. If not, then the process continues to block 638, where a determination is made whether a packet was expected. For example, in some communications systems, the master may send a NULL packet for which a reply is not expected from any slave in the communications system. If a packet was not expected, the process returns to block 602. If a packet was expected and yet not received, the process continues to block 640 where the slave participant updates the slave's lookup table to reflect that a packet was not received, and the process returns to block 602.

If in block 636, the slave participant detects a packet from the master, the process proceeds to block 642, where the slave participant scores the reply packet received from the slave for whom the received packet was intended and who is responding as requested to the master. The slave participant updates the slave's lookup table to reflect the score determined for the reply packet, and the process returns to block 602.

C. Normal Packet

Figure 6C:
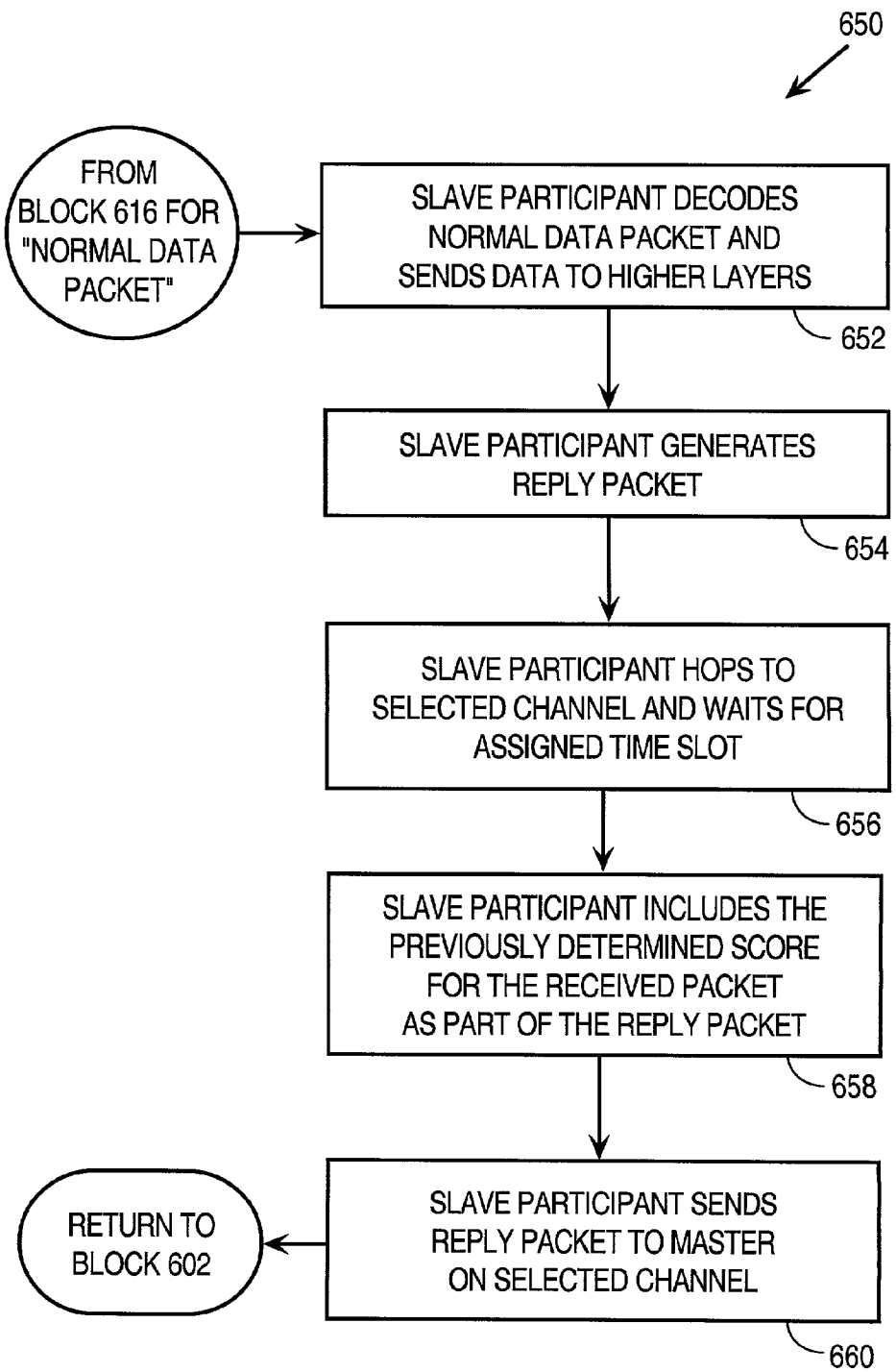
FIG. 6C is a flow diagram that depicts how a slave handles a normal packet from a master, according to an embodiment of the invention.

FIG. 6C is a flow diagram 650 that depicts how a slave handles a normal data packet from a master, according to an embodiment of the invention. The normal data packet from the master may be generated and sent to the slave using the approach discussed above with reference to FIG. 5A. While FIG. 6C describes the transmission of packets as being between a master and a slave, other participants may employ a similar approach for handling normal data packets being transmitted between participants of the communications system. Also, while FIG. 6C depicts a certain set of steps arranged in a particular order, the invention is not limited to the particular steps and order shown, and additional or fewer steps and other orderings of steps may be used in other implementations and communications systems.

Block 652 is reached from block 616 when the packet is determined to be a normal data packet intended for the slave participant. In block 652, the normal data packet is decoded and data is sent to higher layers in the slave participant as necessary. For example, in the situation where the slave participant is a device, the data may include one or more commands to be processed by the device.

In block 654, the slave generates a reply packet. For example, the reply packet may be slave to master packet 350.

In block 656, the slave participant hops to the selected channel and waits for the slave's assigned transmission time slot. The selected channel is the selected channel, such as that identified from channel data 316 in block 610.

In block 658, the slave participant includes the previously determined score for the received packet from block 608 as part of the reply packet. For example, the slave may include performance data for last channel 366 in slave to master packet 350.

In block 660, the slave participant transmits the reply packet to the master on the selected channel that is identified in block 610. The process then returns to block 602.

D. Update Table Packet

Figure 6D:
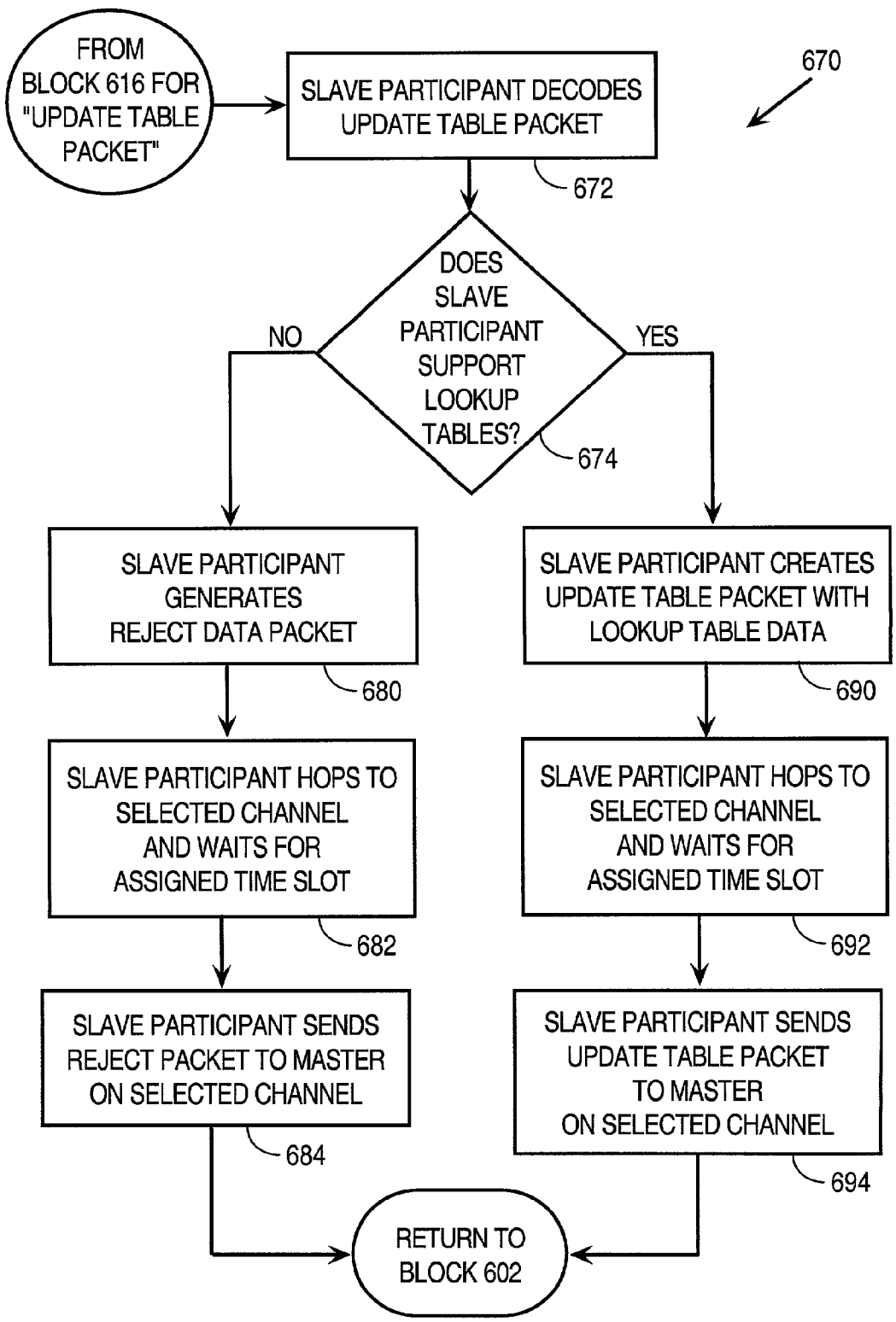
FIG. 6D is a flow diagram that depicts how a slave sends an update table packet to a master in response to a request table packet, according to an embodiment of the invention.

FIG. 6D is a flow diagram 670 that depicts how a slave sends an update table packet to a master in response to a request table packet, according to an embodiment of the invention. The request table packet from the master may be generated and sent to the slave using the approach discussed above with reference to FIG. 5B. While FIG. 6D describes the transmission of packets as being between a master and a slave, other participants may employ a similar approach for request table packets and sending update table packets. Also, while FIG. 6D depicts a certain set of steps arranged in a particular order, the invention is not limited to the particular steps and order shown, and additional or fewer steps and other orderings of steps may be used in other implementations and communications systems.

Block 672 is reached from block 616 when the packet is determined to be an update table packet intended for the slave participant. In block 672, the slave participant decodes the update table packet.

In block 674, determination is made whether the slave participant supports the use of lookup tables, or other approaches for storing channel performance or classification information. If not, the process continues to block 680, and if so, the process continues to block 690.

In block 680, the slave participant generates a reject data packet. The reject data packet includes data that indicates to the master participant that the slave participant will not send lookup table information to the master. In block 682, the slave participant hops to the selected channel and waits for the slave's assigned transmission time slot. In block 684, the slave participant sends the reject data packet to the master on the selected channel, and the process returns to block 602.

In block 690, the slave participant creates an update table packet with the lookup table data requested by the master in the request table data packet. In block 692, the slave participant hops to the selected channel and waits for the slave's assigned transmission time slot. In block 694, the slave participant sends the update table packet to the master on the selected channel, and the process returns to block 602.

VII. Redemption of Channels

According to one embodiment of the invention, a participant periodically checks the number of channels that have acceptable performance and redeems channels with unacceptable performance if the number of channels with acceptable performance is below a specified threshold. As used herein, redeeming channels, or the redemption of channels, refers to increasing the number of channels that are classified as having acceptable performance. For example, channels may be redeemed between the master and one or more slaves. Although the examples herein are discussed in the context of a communications system comprised of a master and slaves, other approaches for configuring communications systems may be used, and the invention is not limited to a particular approach.

According to one embodiment of the invention, a master may use a timer to initiate a check on the number of good channels in the master's lookup table, and if the number of good channels is below a specified threshold, the master may redeem bad channels to ensure that the number of good channels is above the specified threshold. The specified threshold may depend on the particular application or implementation, including but not limited to such factors as the preferences of the users and/or operators of the communications system and the laws or regulations of the country in which the communication system is used.

Redemption of channels may be performed in a variety of ways. For example, the master may adjust the performance threshold used to determine whether a channel's performance is good or bad. By lowering the threshold, channels previously classified as bad may be reclassified as good. As another example, the performance threshold used to determine whether a channel is good or bad may be unchanged, but some of the performance measurements, or scores, may be increased so that some bad channels are reclassified as good channels.

The redemption of channels, and the check performed to determine whether channels should be redeemed, may be triggered in a number of ways. For example, a participant may use a timer and check whether channels should be redeemed when the timer expires. As another example, a participant may check at specified times. As yet another example, a participant may check based on the performance of the communications system.

Figure 7:
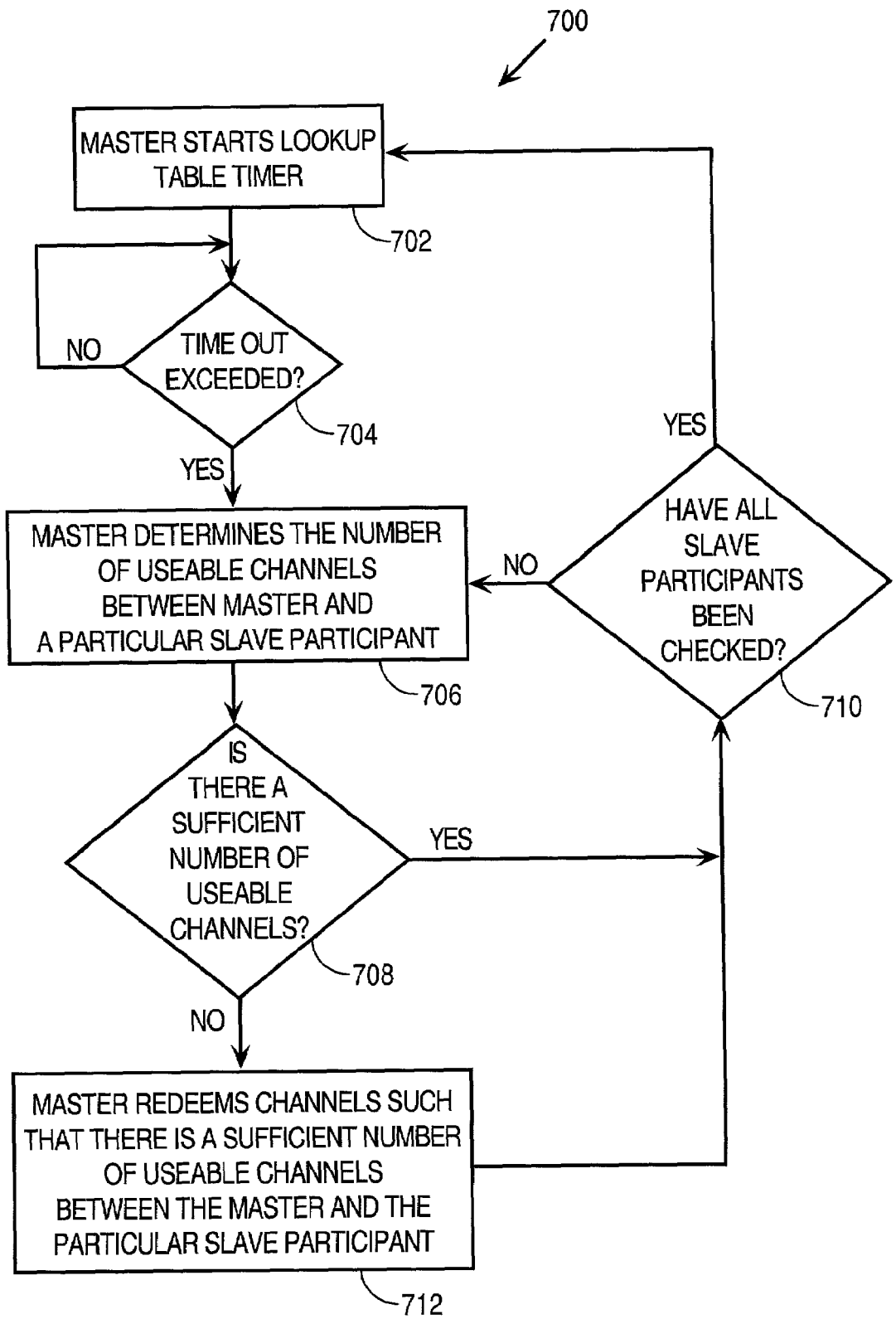
FIG. 7 is a flow diagram that depicts an approach for using a master to check whether communications channels should be redeemed, according to one embodiment of the invention.

FIG. 7 is a flow diagram 700 that depicts an approach by a master to check whether communications channels should be redeemed, according to one embodiment of the invention. While FIG. 7 describes the transmission of packets as being between a master and a slave, other participants may employ a similar approach for redeeming communications channels. Also, while FIG. 7 depicts a certain set of steps arranged in a particular order, the invention is not limited to the particular steps and order shown, and additional or fewer steps and other orderings of steps may be used in other implementations and communications systems.

In block 702, a master starts a lookup table timer.

In block 704, a determination is made whether a timeout, i.e., a specified period of time, has been exceeded. This may be determined, for example, by comparing the time to a specified value. If the timer equals or exceeds the specified value, the timeout has been exceeded. If the timeout is not exceeded, then control continues in block 704.

Once the timeout has been exceeded, then in block 706, the master determines the number of useable channels that are available between the master and a particular slave participant. For example, in a communications system with 50 channels, the master may determined that 23 of the 50 channels are classified as good between the master and a particular slave. A useable channel is a channel whose performance is considered acceptable, such as a good channel in a communications system that classifies channels as either good or bad.

In block 708, a determination is made whether there is a sufficient number of useable channels. For example, in the example above, the specified threshold for the minimum number of good channels may be 35 for the 50 channel communications system. If there are only 23 good channels, then there is not a sufficient number of useable channels.

If in block 708 a determination is made that there is a sufficient number of useable channels, the process continues to block 710 that is discussed below. If not, then the process continues to block 712 where the master redeems channels such that there is a sufficient number of useable channels between the master and the particular slave participant. For example, the master may increase the RSSI value for twelve channels that are closest to the performance threshold between good and bad channels, such that the number of good channels is 35, which satisfies the specified threshold for the number of useable channels in the above example.

In other implementations, the number of channels redeemed may be more than that required to increase the number of useable channels above the specified threshold. For example, sufficient channels may be redeemed to exceed the specified threshold by a specified amount such that there is an increased likelihood that the communications system will continue to have a sufficient number of useable channels for a longer time than might be the case if the number of channels was increased to just meet the specified threshold. As yet another example, an implementation may redeem all of the channels for the participant, which is similar to resetting the lookup table for the participant at the initialization of the communications system discussed above.

In block 710, a determination is made whether all the slave participants have been checked. If so, the process returns to block 702. If not, the process returns to block 706 where another slave participant in the communications system is checked. Blocks 706, 708 and, if necessary, block 712 are repeated for each participant in the communication system. However, in some implementations, fewer than all of the participants may be checked.

VIII. Approach for Master Adaptive Selection of Participants

One problem that arises with the use of communications systems that use multiple channels is that inevitably nearly all channels will experience poor transmission quality at some time, resulting in reduced performance of the system because transmissions must be corrected or repeated. Prior approaches to addressing the poor transmission quality problem include increasing the transmission power of the communications devices making the transmissions. However, increased power leads to shorter battery life for mobile devices, increases the interference caused to other communications systems, and may not be effective for communications with participants that are near a source of interference that may block even the increased power transmissions.

According to one embodiment of the invention, a transmitting communication device selects the recipient of the transmission from a group of potential recipients based on channel performance. FIG. 1C, as discussed above, provides one example of this approach.

As another example, assume that the transmitting device is a master in a FH communications system. The channel on which the master is to transmit next may be determined by the frequency hopping sequence, say channel 82, and therefore the master is not free to choose the channel to use for the transmission. However, the master may not be limited in sending the transmission to a particular slave, such as if there are different transmissions to be made to several slaves or if the same or a similar transmission is to be made to multiple slaves. Therefore, the master may be able to select which slave to transmit to based on channel performance.

Assume for this example that master P4 of FIG. 1A has a similar message to transmit to slaves P1 and P2. If the master maintains a classification lookup table, the master may determine for which slave the channel is good instead of bad. In this example, assume that master P4's classification lookup table indicates that channel 82 is good for slave P2 but bad for slave P1. Master P4 may then choose to transmit the message to slave P2, thereby avoiding the performance problems associated with slave P1 that resulted in channel 82 being classified as bad between master P4 and slave P1. Master P4 may then transmit the message to slave P1 on the next channel as determined from the frequency hopping sequence.

According to other aspects of the invention, the transmitting device may choose which participant to communicate with over a particular channel based on performance information for some or all transmissions. Alternatively, the transmitting device may check the performance data to determine if the channel to be used for the next transmission to the next participant is acceptable or not. If the performance is unacceptable, the transmitting device may then select another participant with which to communicate for whom the channel has acceptable performance.

Further, when selecting a particular participant with which to communicate, the transmitting device may select the first participant identified for which the channel is acceptable. Alternatively, the transmitting device may select the particular participant from among the participants for whom the channel performance is acceptable based on one or more selection criteria. For example, the transmitting device may select the participant with the best performance, or the transmitting device may select a participant whose performance exceeds a specified threshold that may be different than the specified threshold used to determine whether a channel's performance is good or bad.

IX. Implementation Mechanisms

The approach for managing communications channels based on performance may be implemented in a wide variety of networks and contexts. For example, the approach may be implemented in any type of communications network, with or without the use of frequency hopping. For networks that employ frequency hopping, any type of frequency hopping scheme may be used. The approach may also be implemented with any type of network participants. For example, the approach may be implemented in wire-based networks or in wireless networks, where the participants are wireless mobile devices.

Figure 8:
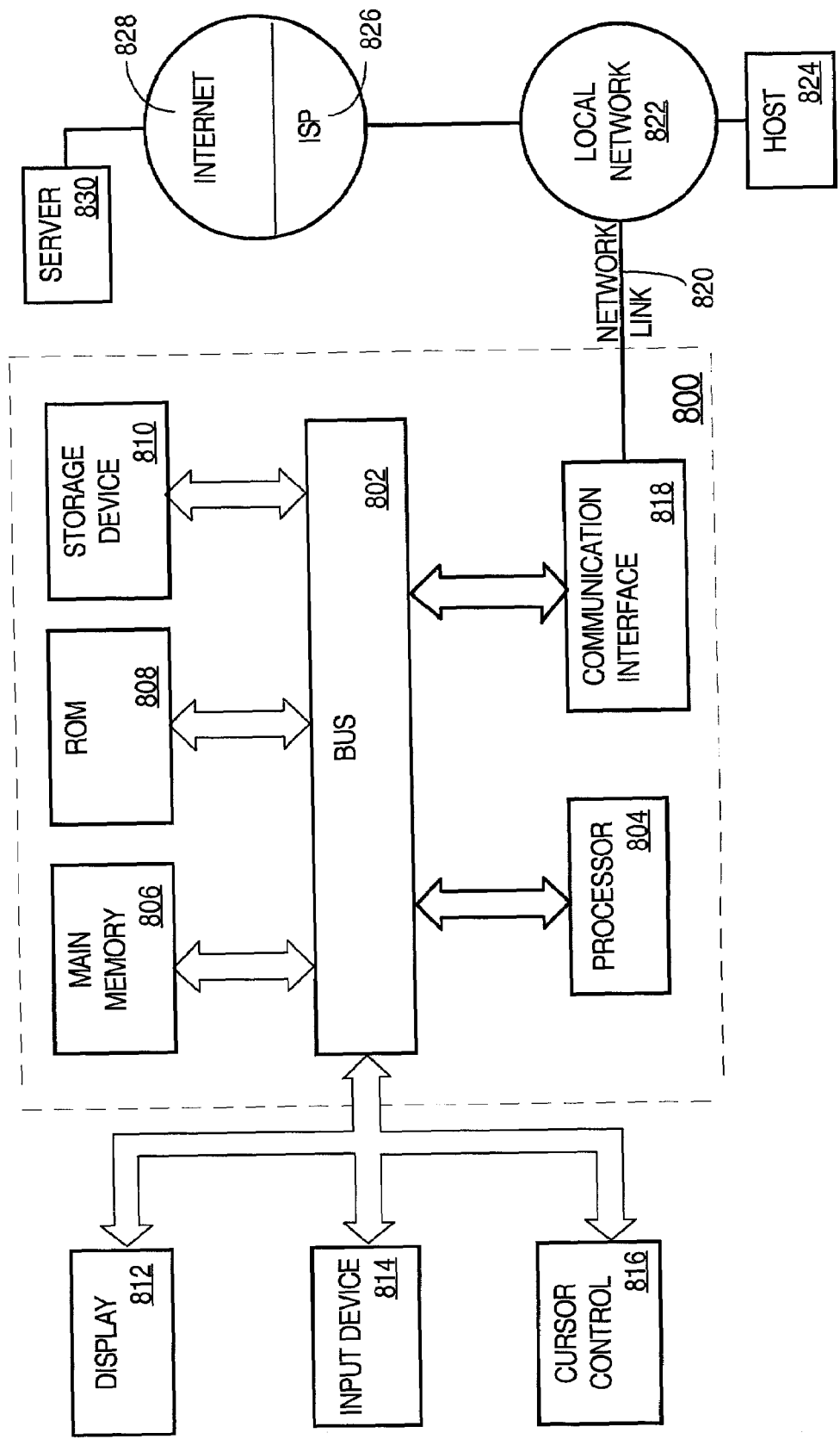
FIG. 8 is a block diagram of a computer system on which embodiments of the invention may be implemented.

FIG. 8 is a block diagram that depicts a computer system 800 upon which an embodiment of the invention may be implemented. Computer system 800 includes a bus 802 or other communication mechanism for communicating information, and a processor 804 coupled with bus 802 for processing information. Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

The invention is related to the use of computer system 800 for implementing the techniques described herein. According to one embodiment of the invention, those techniques are performed by computer system 800 in response to processor 804 executing one or more sequences of one or more instructions contained in main memory 806. Such instructions may be read into main memory 806 from another computer-readable medium, such as storage device 810. Execution of the sequences of instructions contained in main memory 806 causes processor 804 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 804 for execution. Such a medium may take many forms, including but not limited to, non-volatile media, volatile media, and transmission media. Non-volatile media includes, for example, optical or magnetic disks, such as storage device 810. Volatile media includes dynamic memory, such as main memory 806. Transmission media includes coaxial cables, copper wire and fiber optics, including the wires that comprise bus 802.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 804 for execution. For example, the instructions may initially be carried on a magnetic disk of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infrared signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are exemplary forms of carrier waves transporting the information.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution. In this manner, computer system 800 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for selecting communications channels for a communications system, the method comprising the computer-implemented steps of:
   a communications device selecting, based upon performance of a plurality of communications channels and at least one performance criterion, a first communications channel from the plurality of communications channels;
   generating channel identification data that identifies the first communications channel;
   providing the channel identification data to a first participant;
   receiving a first communication from the first participant over a second communications channel from the plurality of communications channels;
   wherein the plurality of communications channels correspond to a set of frequencies and the first communication received from the first participant is based on a hopping sequence among at least two communications channels of the plurality of communications channels, according to a frequency hopping protocol; and
   wherein the channel identification data specifies that the first communications channel is not to be used by the first participant for the first communication.

2. The method of claim 1, wherein the second communications channel is not the first communications channel.

3. The method of claim 1, wherein:
   the plurality of communications channels is used according to an order of the plurality of communications channels;
   the channel identification data specifies that the first communications channel is not to be used by the first participant for the first communication when the first communications channel is selected for use based on the order;
   the second communications channel immediately follows the first communications channel in the order; and
   the first participant uses the second communications channel instead of the first communications channel.

4. The method of claim 1, wherein the communications system uses a protocol that is selected from the group consisting of a frequency hopping protocol, a frequency hopping protocol defined by Institute of Electrical and Electronics Engineers 802.15.1 Wireless Personal Area Network Standard, and a frequency hopping protocol that conforms to a Bluetooth communications standard for transmissions over a 2.4 GHz band.

5. The method of claim 1, wherein the channel identification data is first channel identification data, and wherein the method further comprises the computer-implemented steps of:
   selecting, based upon the performance of the plurality of communications channels and the at least one performance criterion, a third communications channel from the plurality of communications channels;
   generating second channel identification data that identifies the third communications channel;
   providing the second channel identification data to a second participant;
   receiving a second communication from the second participant over a fourth communications channel from the plurality of communications channels, wherein the fourth communications channel is determined based on the second channel identification data that identifies the third communications channel; and
   prior to selecting the third communications channel, determining the performance of the plurality of communications channels.

6. The method of claim 1, further comprising the computer-implemented steps of:
   sending a second communication to a second participant, wherein the second communication does not include data that identifies a particular channel; and
   receiving a third communication from the second participant over a third communications channel of the plurality of communications channels.

7. The method of claim 1, further comprising the computer-implemented step of:
   determining the performance of the plurality of communications channels, based on a channel performance testing technique selected from the group consisting of a received signal strength indicator, a header error check, a cyclic redundancy check, and forward error correction.

8. The method of claim 1, wherein the step of providing the channel identification data to the first participant comprises the computer-implemented step of:
providing the channel identification data to the first participant over a third communications channel of the plurality of communications channels, wherein the third communications channel is not the first communications channel; and
wherein the first communication from the first participant includes data that indicates the performance of the third communications channel.

9. The method of claim 1, wherein the step of selecting the first communications channel from the plurality of communications channels comprises the computer-implemented steps of:
classifying one or more communications channels of the plurality of communications channels based upon whether the performance of the one or more communications channels satisfies at least one performance criterion; and
selecting the first communications channel from the one or more communications channels that are classified as satisfying the at least one performance criterion.

10. The method of claim 9, further comprising the computer-implemented steps of:
determining a number of communications channels of the plurality of communications channels that satisfy the at least one performance criterion; and
if the number of communications channels that satisfy the at least one performance criterion is less than a specified number, reclassifying one or more communications channels of the plurality of communications channels.

11. The method of claim 10, wherein the number of communications channels of the plurality of communications channels that satisfy the at least one performance criterion is determined after expiration of a specified length of time.

12. The method of claim 10, wherein the step of reclassifying the one or more communications channels comprises the computer-implemented step of:
reclassifying one or more communications channels of the plurality of communications channels based upon the at least one performance criterion and an adjusted performance of the one or more communications channels; and
wherein the adjusted performance of the one or more communications channels is determined such that the number of communications channels that satisfy the at least one performance criterion is not less than the specified number.

13. The method of claim 10, wherein the step of reclassifying the one or more communications channels comprises the computer-implemented step of:
reclassifying one or more communications channels of the plurality of communications channels based upon the performance of the one or more communications channels and at least one revised performance criterion; and
wherein the at least one revised performance criterion is selected such that the number of communications channels that satisfy the at least one performance criterion is not less than the specified number.

14. The method of claim 1, wherein:
the first participant is selected from the group consisting of a slave, a first wireless device, and a first mobile device;
a second participant is selected from the group consisting of a master, a second wireless device, and a second mobile device; and
the second participant performs the steps of selecting, generating, providing, and receiving.

15. A method for selecting a particular participant with which to communicate in a communications system, comprising the computer-implemented steps of:
a communication device determining the performance of a first communications channel between a specified participant and a plurality of other participants;
selecting, based upon the performance of the first communications channel between the specified participant and the plurality of other participants and at least one selection criterion, the particular participant from the plurality of other participants;
sending a first communication over the first communications channel from the specified participant to the particular participant;
determining the performance of a plurality of communications channels;
selecting, based upon the performance of the plurality of communications channels and at least one performance criterion, a second communications channel from the plurality of communications channels;
generating channel identification data that identifies the second communications channel;
providing the channel identification data to a second participant; and
receiving at the specified participant a second communication from the second participant over a third communications channel, wherein the third communications channel is determined based on the channel identification data that identifies the second communications channel,
wherein the plurality of communications channels correspond to a set of frequencies and communications from the particular participant are based on a hopping sequence among at least two communications channels of the plurality of communications channels according to a frequency hopping protocol.

16. The method of claim 15, wherein the second participant is not the particular participant.

17. The method of claim 15, wherein the second participant is the particular participant.

18. The method of claim 15, wherein:
the first communication includes the channel identification data; and
the second communication is received in response to the first communication.

19. The method of claim 15, wherein the channel identification data specifies that the second communications channel is to be used by the second participant for the second communication, and wherein the third communications channel is the second communications channel.

20. The method of claim 15, wherein the channel identification data specifies that the second communications channel is not to be used by the second participant for the second communication, and wherein the third communications channel is not the second communications channel.

21. The method of claim 15, wherein the plurality of communications channels is used according to an order of the plurality of communications channels, wherein the channel identification data specifies that the second communications channel is not to be used by the second participant for the second communication when the second communications channel is selected for use based on the order, and wherein the third communications channel immediately follows the second communications channel in the order.

22. The method of claim 15, further comprising the computer-implemented steps of:
determining the performance of a second communications channel between the specified participant and the plurality of other participants;
selecting, based upon the performance of the second communications channel and at least one selection criterion, a third participant from the plurality of other participants, wherein the third participant is not the particular participant; and
sending a third communication over the second communications channel from the specified participant to the third participant.

23. The method of claim 15, further comprising the computer-implemented steps of:
maintaining performance data that is based upon the performance of the first communications channel; and
wherein the step of selecting the particular participant comprises the computer-implemented step of:
selecting, based upon the performance data and the at least one selection criterion, the particular participant from the plurality of other participants.

24. The method of claim 15, wherein:
the particular participant is a first participant that is selected from the group consisting of a slave, a first wireless device, and a first mobile device;
a second participant is selected from the group consisting of a master, a second wireless device, and a second mobile device; and
the second participant performs the steps of determining and selecting.

25. A method for using selected communications channels in a communications system, comprising the computer-implemented steps of:
a communication device receiving a first communication from a participant, wherein the first communication includes first channel identification data that identifies a first communications channel, wherein the first communications channel is selected based upon the performance of a plurality of communications channels and at least one performance criterion;
identifying a second communications channel from the plurality of communications channels;
sending a second communication to the participant over the second communications channel;
wherein the plurality of communications channels correspond to a set of frequencies and the second communication is sent to the participant based on a hopping sequence among at least two communications channels of the plurality of communications channels according to a frequency hopping protocol; and
wherein the first channel identification data specifies that the first communications channel is not to be used for the second communication.

26. The method of claim 25, further comprising the computer-implemented steps of:
after identifying the second communications channel, storing second channel identification data that identifies the second communications channel; and
prior to sending the second communication, retrieving the second channel identification data.

27. The method of claim 25, wherein the first communication is received over a third communications channel of the plurality of communications channels, and the method further comprises the computer-implemented steps of:
determining the performance of the third communications channel based on the first communication;
generating performance data based on the performance of the third communications channel; and
including the performance data in the second communication.

28. The method of claim 25, wherein the participant is a first participant, and wherein the method further comprises the computer-implemented step of:
receiving a third communication that is sent from a second participant to the first participant over a fourth communications channel; and
determining the performance of the fourth communications channel based on the third communication.

29. The method of claim 28, wherein the first participant is a master, the second participant is a first slave, and wherein a second slave performs the steps of receiving the first communication, determining the second communications channel, sending the second communication, receiving the third communication, and determining the performance of the fourth communications channel.

30. A method for managing performance data for communications channels between participants in a communications system, the method comprising the computer-implemented steps of:
a communication device determining the performance of a plurality of communications channels;
creating and maintaining, at a first participant of a plurality of participants, first performance data that indicates the performance of at least one communications channel of the plurality of communications channels between the first participant and at least a second participant of the plurality of participants;
requesting and receiving second performance data from a third participant, wherein the second performance data indicates the performance of at least one communications channel of the plurality of communications channels between the third participant and at least a fourth participant of the plurality of participants; and
creating and maintaining revised first performance data based on the first performance data and the second performance data.

31. The method of claim 30, wherein the communications system uses a protocol that is selected from the group consisting of a frequency hopping protocol, a frequency hopping protocol defined by Institute of Electrical and Electronics Engineers 802.15.1 Wireless Personal Area Network Standard, and a frequency hopping protocol that conforms to a Bluetooth communications standard for transmissions over a 2.4 GHz band.

32. The method of claim 30, wherein the plurality of communications channels correspond to a set of frequencies and communications with the first participant, the second participant, the third participant, and the fourth participant are based on a hopping sequence among at least two communications channels of the plurality of communications channels according to a frequency hopping protocol.

33. The method of claim 30, wherein the third participant is the second participant and wherein the fourth participant is the first participant.

34. The method of claim 30, further comprising the computer-implemented steps of:
storing the first performance data in a lookup table; and
storing the revised first performance data in the lookup table.

35. The method of claim 30, further comprising the computer-implemented steps of:

selecting, based upon the revised first performance data and at least one performance criterion, a first communications channel from the plurality of communications channels;

generating channel identification data that identifies the first communications channel;

providing the channel identification data to a fifth participant; and receiving a communication from the fifth participant over a second communications channel from the plurality of communications channels, wherein the second communications channel is determined based on the channel identification data that identifies the first communications channel.

36. A method for selecting communications channels for a communications system that uses a frequency hopping protocol, comprising the computer-implemented steps of:

a communication device selecting, based upon performance of a plurality of communications channels and at least one performance criterion, a first communications channel from the plurality of communications channels;

generating first channel identification data that both identifies the first communications channel and specifies that the first communications channel is not to be used;

providing the first channel identification data to a first participant over a second communications channel of the plurality of communications channels, wherein the second communications channel is not the first communications channel;

receiving a first communication from the first participant over a third communications channel, wherein the first communication includes first performance data that indicates the performance of the second communications channel;

selecting, based upon the performance of the plurality of communications channels and the at least one performance criterion, a fourth communications channel from the plurality of communications channels;

generating second channel identification data that both identifies the fourth communications channel and specifies that the fourth communications channel is not to be used;

providing the second channel identification data to a second participant over a fifth communications channel of the plurality of communications channels, wherein the fifth communications channel is not the fourth communications channel; and receiving a second communication from the second participant over a sixth communications channel, wherein the second communication includes second performance data that indicates the performance of the fifth communications channel.

37. The method of claim 36, further comprising the computer-implemented steps of:

classifying one or more communications channels of the plurality of communications channels as either good or bad based upon the performance of the one or more communications channels and at least one performance criterion;

wherein the step of selecting the first communications channel from the plurality of communications channels comprises the computer-implemented step of:

selecting the first communications channel from the one or more communications channels that are classified as bad; and wherein the step of selecting the fourth communications channel from the plurality of communications channels comprises the computer-implemented step of:

selecting the fourth communications channel from the one or more communications channels that are classified as bad.

38. The method of claim 36, wherein:

the step of providing the first channel identification data to a first participant comprises the computer-implemented steps of:

creating a first data packet that includes the first channel identification data; and sending the first data packet to the first participant over the second communications channel; and the step of providing the second channel identification data to a second participant comprises the computer-implemented steps of:

creating a second data packet that includes the second channel identification data; and sending the second data packet to the second participant over the fifth communications channel.

39. The method of claim 38, wherein:

the first data packet comprises a first normal data packet;

the first channel identification data is appended to the first normal data packet;

the second data packet comprises a second normal data packet; and the second channel identification data is appended to the second normal data packet.

40. The method of claim 36, wherein:

the first communication comprises a first reply data packet that includes the first performance data;

the second communication comprises a second reply data packet that includes the second performance data;

the first reply data packet comprises a first normal data packet;

the first performance data is appended to the first normal data packet;

the second reply data packet comprises a second normal data packet; and the second performance data is appended to the second normal data packet.

41. A communications device comprising:

an interface configured to receive data from a plurality of communications devices and to transmit data to other communications devices; and a mechanism communicatively coupled to the interface and configured to:

select, based upon performance of a plurality of communications channels and at least one performance criterion, a first communications channel from the plurality of communications channels;

generate first channel identification data that identifies the first communications channel;

provide the first channel identification data to a first communications device;

receive a first communication from the first communications device over a second communications channel from the plurality of communications channels;

wherein the plurality of communications channels correspond to a set of frequencies and the first communication received from the first participant is based on a hopping sequence among at least two communications channels of the plurality of communications channels, according to a frequency hopping protocol; and wherein the first channel identification data specifies that the first communications channel is not to be used by the first communications device for the first communication.

42. The communications device of claim 41, wherein the second communications channel is not the first communications channel.

43. The communications device of claim 41, wherein:
the plurality of communications channels is used according to an order of the plurality of communications channels;
the first channel identification data specifies that the first communications channel is not to be used by the first communications device for the first communication when the first communications channel is selected for use based on the order;
the second communications channel immediately follows the first communications channel in the order; and
the first communications device uses the second communications channel instead of the first communications channel.

44. The communications device of claim 41, wherein the communications system uses a protocol that is selected from the group consisting of a frequency hopping protocol, a frequency hopping protocol defined by Institute of Electrical and Electronics Engineers 802.15.1 Wireless Personal Area Network Standard, and a frequency hopping protocol that conforms to a Bluetooth communications standard for transmissions over a 2.4 GHz band.

45. The communications device of claim 41, wherein the mechanism is further configured to:
select, based upon the performance of the plurality of communications channels and the at least one performance criterion, a third communications channel from the plurality of communications channels;
generate second channel identification data that identifies the third communications channel;
provide the second channel identification data to a second communications device; and
receive a second communication from the second communications device over a fourth communications channel from the plurality of communications channels, wherein the fourth communications channel is determined based on the second channel identification data that identifies the third communications channel.

46. The communications device of claim 41, wherein the mechanism is further configured to:
provide the channel identification data to the first communications device over a specified communications channel of the plurality of communications channels, wherein the specified communications channel is not the first communications channel; and
the first communication from the first communications device includes performance data that indicates the performance of the specified communications channel.

47. The communications device of claim 41, wherein the mechanism is further configured to:
send a second communication to a second communications device, wherein the second communication does not include data that identifies a particular channel; and
receive a third communication from the second communications device over a third communications channel of the plurality of communications channels.

48. The communications device of claim 41, wherein the mechanism is further configured to:
determine the performance of a plurality of communications channels used by the plurality of communications devices, based on a channel performance testing technique selected from the group consisting of a received signal strength indicator, a header error check, a cyclic redundancy check, and forward error correction.

49. The communications device of claim 41, wherein the mechanism is further configured to:
classify one or more communications channels of the plurality of communications channels based upon whether the performance of the one or more communications channels satisfies at least one performance criterion; and
select the first communications channel from the one or more communications channels that are classified as satisfying the at least one performance criterion.

50. The communications device of claim 41, wherein:
the communications device is a second communications device;
the first communications device is selected from the group consisting of a slave, a first wireless device, and a first mobile device; and
the second communications device is selected from the group consisting of a master, a second wireless device, and a second mobile device.

51. The communications device of claim 41, wherein the mechanism is further configured to:
determine a number of communications channels of the plurality of communications channels that satisfy the at least one performance criterion; and
if the number of communications channels that satisfy the at least one performance criterion is less than a specified number, reclassify one or more communications channels of the plurality of communications channels.

52. The communications device of claim 51, wherein:
the number of communications channels of the plurality of communications channels that satisfy the at least one performance criterion is determined after expiration of a specified length of time;
the mechanism is further configured to reclassify the one or more communications channels by reclassifying one or more communications channels of the plurality of communications channels based upon the at least one performance criterion and an adjusted performance of the one or more communications channels;
wherein the adjusted performance of the one or more communications channels is determined such that the number of communications channels that satisfy the at least one performance criterion is not less than the specified number;
the mechanism is further configured to reclassify the one or more communications channels by reclassifying one or more communications channels of the plurality of communications channels based upon the performance of the one or more communications channels and at least one revised performance criterion;
wherein the at least one revised performance criterion is selected such that the number of communications channels that satisfy the at least one performance criterion is not less than the specified number.

53. A computer-readable medium carrying one or more sequences of instructions for selecting communications channels for a communications system, wherein execution of the one or more sequences of instructions by one or more processors causes the one or more processors to perform the steps of:
selecting, based upon performance of a plurality of communications channels and at least one performance criterion, a first communications channel from the plurality of communications channels;

generating channel identification data that identifies the first communications channel;

providing the channel identification data to a first participant;

receiving a first communication from the first participant over a second communications channel from the plurality of communications channels; and wherein the plurality of communications channels correspond to a set of frequencies and the first communication received from the first participant is based on a hopping sequence among at least two communications channels of the plurality of communications channels, according to a frequency hopping protocol; and wherein the channel identification data specifies that the first communications channel is not to be used by the first participant for the first communication.

54. The computer-readable medium of claim 52, wherein the second communications channel is not the first communications channel.

55. The computer-readable medium of claim 52, wherein:

the plurality of communications channels is used according to an order of the plurality of communications channels;

the channel identification data specifies that the first communications channel is not to be used by the first participant for the first communication when the first communications channel is selected for use based on the order;

the second communications channel immediately follows the first communications channel in the order; and the first participant uses the second communications channel instead of the first communications channel.

56. The computer-readable medium of claim 52, wherein the communications system uses a protocol that is selected from the group consisting of a frequency hopping protocol, a frequency hopping protocol defined by Institute of Electrical and Electronics Engineers 802.15.1 Wireless Personal Area Network Standard, and a frequency hopping protocol that conforms to a Bluetooth communications standard for transmissions over a 2.4 GHz band.

57. The computer-readable medium of claim 52, wherein the channel identification data is first channel identification data, and wherein the computer-readable medium further comprises one or more sequences of instructions, wherein execution of the one or more sequences of instructions by one or more processors causes the one or more processors to perform the steps of:

selecting, based upon the performance of the plurality of communications channels and the at least one performance criterion, a third communications channel from the plurality of communications channels;

generating second channel identification data that identifies the third communications channel;

providing the second channel identification data to a second participant;

receiving a second communication from the second participant over a fourth communications channel from the plurality of communications channels, wherein the fourth communications channel is determined based on the second channel identification data that identifies the third communications channel; and prior to selecting the third communications channel, determining the performance of the plurality of communications channels.

58. The computer-readable medium of claim 52, further comprising one or more sequences of instructions, wherein execution of the one or more sequences of instructions by one or more processors causes the one or more processors to perform the steps of:

sending a second communication to a second participant, wherein the second communication does not include data that identifies a particular channel; and receiving a third communication from the second participant over a third communications channel of the plurality of communications channels.

59. The computer-readable medium of claim 52, further comprising one or more sequences of instructions, wherein execution of the one or more sequences of instructions by one or more processors causes the one or more processors to perform the step of:

determining the performance of the plurality of communications channels, based on a channel performance testing technique selected from the group consisting of a received signal strength indicator, a header error check, a cyclic redundancy check, and forward error correction.

60. The computer-readable medium of claim 52, wherein the instructions for providing the channel identification data to the first participant comprises one or more sequences of instructions, wherein execution of the one or more sequences of instructions by one or more processors causes the one or more processors to perform the step of:

providing the channel identification data to the first participant over a third communications channel of the plurality of communications channels, wherein the third communications channel is not the first communications channel; and wherein the first communication from the first participant includes data that indicates the performance of the third communications channel.

61. The computer-readable medium of claim 52, wherein the instructions for selecting the first communications channel from the plurality of communications channels comprises one or more sequences of instructions, wherein execution of the one or more sequences of instructions by one or more processors causes the one or more processors to perform the steps of:

classifying one or more communications channels of the plurality of communications channels based upon whether the performance of the one or more communications channels satisfies at least one performance criterion; and selecting the first communications channel from the one or more communications channels that are classified as satisfying the at least one performance criterion.

62. The computer-readable medium of claim 61, further comprising one or more sequences of instructions, wherein execution of the one or more sequences of instructions by one or more processors causes the one or more processors to perform the steps of:

determining a number of communications channels of the plurality of communications channels that satisfy the at least one performance criterion; and if the number of communications channels that satisfy the at least one performance criterion is less than a specified number, reclassifying one or more communications channels of the plurality of communications channels.

63. The computer-readable medium of claim 62, wherein the number of communications channels of the plurality of communications channels that satisfy the at least one performance criterion is determined after expiration of a specified length of time.

64. The computer-readable medium of claim 62, wherein the instructions for reclassifying the one or more communications channels comprises one or more sequences of instructions, wherein execution of the one or more sequences of instructions by one or more processors causes the one or more processors to perform the step of:
  reclassifying one or more communications channels of the plurality of communications channels based upon the at least one performance criterion and an adjusted performance of the one or more communications channels; and
  wherein the adjusted performance of the one or more communications channels is determined such that the number of communications channels that satisfy the at least one performance criterion is not less than the specified number.

65. The computer-readable medium of claim 62, wherein the instructions for reclassifying the one or more communications channels comprises one or more sequences of instructions, wherein execution of the one or more sequences of instructions by one or more processors causes the one or more processors to perform the step of:
  reclassifying one or more communications channels of the plurality of communications channels based upon the performance of the one or more communications channels and at least one revised performance criterion; and
  wherein the at least one revised performance criterion is selected such that the number of communications channels that satisfy the at least one performance criterion is not less than the specified number.

66. The computer-readable medium of claim 52, wherein:
  the first participant is selected from the group consisting of a slave, a first wireless device, and a first mobile device;
  a second participant is selected from the group consisting of a master, a second wireless device, and a second mobile device; and
  the second participant performs the steps of selecting, generating, providing, and receiving.

67. A computer-readable medium carrying one or more sequences of instructions for selecting a particular participant with which to communicate in a communications system, wherein execution of the one or more sequences of instructions by one or more processors causes the one or more processors to perform the steps of:
  determining the performance of a first communications channel between a specified participant and a plurality of other participants;
  selecting, based upon the performance of the first communications channel between the specified participant and the plurality of other participants and at least one selection criterion, the particular participant from the plurality of other participants;
  sending a first communication over the first communications channel from the specified participant to the particular participant;
  determining the performance of a plurality of communications channels;
  selecting, based upon the performance of the plurality of communications channels and at least one performance criterion, a second communications channel from the plurality of communications channels;
  generating channel identification data that identifies the second communications channel;
  providing the channel identification data to a second participant; and
  receiving at the specified participant a second communication from the second participant over a third communications channel, wherein the third communications channel is determined based on the channel identification data that identifies the second communications channel,
  wherein the plurality of communications channels correspond to a set of frequencies and communications from the particular participant are based on a hopping sequence among at least two communications channels of the plurality of communications channels according to a frequency hopping protocol.

68. The computer-readable medium of claim 67, wherein the second participant is not the particular participant.

69. The computer-readable medium of claim 67, wherein the second participant is the particular participant.

70. The computer-readable medium of claim 67, wherein:
  the first communication includes the channel identification data; and
  the second communication is received in response to the first communication.

71. The computer-readable medium of claim 67, wherein the channel identification data specifies that the second communications channel is to be used by the second participant for the second communication, and wherein the third communications channel is the second communications channel.

72. The computer-readable medium of claim 67, wherein the channel identification data specifies that the second communications channel is not to be used by the second participant for the second communication, and wherein the third communications channel is not the second communications channel.

73. The computer-readable medium of claim 67, wherein the plurality of communications channels is used according to an order of the plurality of communications channels, wherein the channel identification data specifies that the second communications channel is not to be used by the second participant for the second communication when the second communications channel is selected for use based on the order, and wherein the third communications channel immediately follows the second communications channel in the order.

74. The computer-readable medium of claim 67, further comprising one or more sequences of instructions, wherein execution of the one or more sequences of instructions by one or more processors causes the one or more processors to perform the steps of:
  determining the performance of a second communications channel between the specified participant and the plurality of other participants;
  selecting, based upon the performance of the second communications channel and at least one selection criterion, a third participant from the plurality of other participants, wherein the third participant is not the particular participant; and
  sending a third communication over the second communications channel from the specified participant to the third participant.

75. The computer-readable medium of claim 67, further comprising one or more sequences of instructions, wherein execution of the one or more sequences of instructions by one or more processors causes the one or more processors to perform the steps of:
  maintaining performance data that is based upon the performance of the first communications channel; and
  wherein the instructions for selecting the particular participant further comprise one or more sequences of instructions, wherein execution of the one or more sequences of instructions by one or more processors causes the one or more processors to perform the step of:

selecting, based upon the performance data and the at least one selection criterion, the particular participant from the plurality of other participants.

76. The computer-readable medium of claim 67, wherein:
the particular participant is a first participant that is selected from the group consisting of a slave, a first wireless device, and a first mobile device;
a second participant is selected from the group consisting of a master, a second wireless device, and a second mobile device; and
the second participant performs the steps of determining and selecting.

77. A computer-readable medium carrying one or more sequences of instructions for using selected communications channels in a communications system, wherein execution of the one or more sequences of instructions by one or more processors causes the one or more processors to perform the steps of:
receiving a first communication from a participant, wherein the first communication includes first channel identification data that identifies a first communications channel, wherein the first communications channel is selected based upon the performance of a plurality of communications channels and at least one performance criterion;
identifying a second communications channel from the plurality of communications channels;
sending a second communication to the participant over the second communications channel;
wherein the plurality of communications channels correspond to a set of frequencies and the second communication is sent to the participant based on a hopping sequence among at least two communications channels of the plurality of communications channels according to a frequency hopping protocol; and
wherein the first channel identification data specifies that the first communications channel is not to be used for the second communication.

78. The computer-readable medium of claim 77, further comprising one or more sequences of instructions, wherein execution of the one or more sequences of instructions by one or more processors causes the one or more processors to perform the steps of:
after identifying the second communications channel, storing second channel identification data that identifies the second communications channel; and
prior to sending the second communication, retrieving the second channel identification data.

79. The computer-readable medium of claim 77, wherein the first communication is received over a third communications channel of the plurality of communications channels, and further comprising one or more sequences of instructions, wherein execution of the one or more sequences of instructions by one or more processors causes the one or more processors to perform the steps of:
determining the performance of the third communications channel based on the first communication;
generating performance data based on the performance of the third communications channel; and
including the performance data in the second communication.

80. The computer-readable medium of claim 77, wherein the participant is a first participant, and further comprising one or more sequences of instructions, wherein execution of the one or more sequences of instructions by one or more processors causes the one or more processors to perform the steps of receiving a third communication that is sent from a second participant to the first participant over a fourth communications channel; and
determining the performance of the fourth communications channel based on the third communication.

81. The computer-readable medium of claim 80, wherein the first participant is a master, the second participant is a first slave, and wherein a second slave performs the steps of receiving the first communication, determining the second communications channel, sending the second communication, receiving the third communication, and determining the performance of the fourth communications channel.

82. A computer-readable medium carrying one or more sequences of instructions for managing performance data for communications channels between participants in a communications system, wherein execution of the one or more sequences of instructions by one or more processors causes the one or more processors to perform the steps of:
determining the performance of a plurality of communications channels;
creating and maintaining, at a first participant of a plurality of participants, first performance data that indicates the performance of at least one communications channel of the plurality of communications channels between the first participant and at least a second participant of the plurality of participants;
requesting and receiving second performance data from a third participant, wherein the second performance data indicates the performance of at least one communications channel of the plurality of communications channels between the third participant and at least a fourth participant of the plurality of participants; and
creating and maintaining revised first performance data based on the first performance data and the second performance data.

83. The computer-readable medium of claim 82, wherein the communications system uses a protocol that is selected from the group consisting of a frequency hopping protocol, a frequency hopping protocol defined by Institute of Electrical and Electronics Engineers 802.15.1 Wireless Personal Area Network Standard, and a frequency hopping protocol that conforms to a Bluetooth communications standard for transmissions over a 2.4 GHz band.

84. The computer-readable medium of claim 82, wherein the plurality of communications channels correspond to a set of frequencies and communications with the first participant, the second participant, the third participant, and the fourth participant are based on a hopping sequence among at least two communications channels of the plurality of communications channels according to a frequency hopping protocol.

85. The computer-readable medium of claim 82, wherein the third participant is the second participant and wherein the fourth participant is the first participant.

86. The computer-readable medium of claim 82, further comprising one or more sequences of instructions, wherein execution of the one or more sequences of instructions by one or more processors causes the one or more processors to perform the steps of:
storing the first performance data in a lookup table; and
storing the revised first performance data in the lookup table.

87. The computer-readable medium of claim 82, further comprising one or more sequences of instructions, wherein execution of the one or more sequences of instructions by one or more processors causes the one or more processors to perform the steps of:

selecting, based upon the revised first performance data and at least one performance criterion, a first communications channel from the plurality of communications channels;

generating channel identification data that identifies the first communications channel;

providing the channel identification data to a fifth participant; and receiving a communication from the fifth participant over a second communications channel from the plurality of communications channels, wherein the second communications channel is determined based on the channel identification data that identifies the first communications channel.

88. A computer-readable medium carrying one or more sequences of instructions for selecting communications channels for a communications system that uses a frequency hopping protocol, wherein execution of the one or more sequences of instructions by one or more processors causes the one or more processors to perform the steps of:

selecting, based upon performance of a plurality of communications channels and at least one performance criterion, a first communications channel from the plurality of communications channels;

generating first channel identification data that both identifies the first communications channel and specifies that the first communications channel is not to be used;

providing the first channel identification data to a first participant over a second communications channel of the plurality of communications channels, wherein the second communications channel is not the first communications channel;

receiving a first communication from the first participant over a third communications channel, wherein the first communication includes first performance data that indicates the performance of the second communications channel;

selecting, based upon the performance of the plurality of communications channels and the at least one performance criterion, a fourth communications channel from the plurality of communications channels;

generating second channel identification data that both identifies the fourth communications channel and specifies that the fourth communications channel is not to be used;

providing the second channel identification data to a second participant over a fifth communications channel of the plurality of communications channels, wherein the fifth communications channel is not the fourth communications channel; and receiving a second communication from the second participant over a sixth communications channel, wherein the second communication includes second performance data that indicates the performance of the fifth communications channel.

89. The computer-readable medium of claim 88, further comprising one or more sequences of instructions, wherein execution of the one or more sequences of instructions by one or more processors causes the one or more processors to perform the steps of:

classifying one or more communications channels of the plurality of communications channels as either good or bad based upon the performance of the one or more communications channels and at least one performance criterion;

wherein the instructions for selecting the first communications channel from the plurality of communications channels further comprise one or more sequences of instructions, wherein execution of the one or more sequences of instructions by one or more processors causes the one or more processors to perform the step of:

selecting the first communications channel from the one or more communications channels that are classified as bad; and wherein the instructions for selecting the fourth communications channel from the plurality of communications channels further comprise one or more sequences of instructions, wherein execution of the one or more sequences of instructions by one or more processors causes the one or more processors to perform the step of:

selecting the fourth communications channel from the one or more communications channels that are classified as bad.

90. The computer-readable medium of claim 88, wherein:

the instructions for providing the first channel identification data to a first participant further comprise one or more sequences of instructions, wherein execution of the one or more sequences of instructions by one or more processors causes the one or more processors to perform the steps of:

creating a first data packet that includes the first channel identification data; and sending the first data packet to the first participant over the second communications channel; and the instructions for providing the second channel identification data to a second participant further comprise one or more sequences of instructions, wherein execution of the one or more sequences of instructions by one or more processors causes the one or more processors to perform the steps of:

creating a second data packet that includes the second channel identification data; and sending the second data packet to the second participant over the fifth communications channel.

91. The computer-readable medium of claim 90, wherein:

the first data packet comprises a first normal data packet;

the first channel identification data is appended to the first normal data packet;

the second data packet comprises a second normal data packet; and the second channel identification data is appended to the second normal data packet.

92. The computer-readable medium of claim 88, wherein:

the first communication comprises a first reply data packet that includes the first performance data;

the second communication comprises a second reply data packet that includes the second performance data;

the first reply data packet comprises a first normal data packet;

the first performance data is appended to the first normal data packet;

the second reply data packet comprises a second normal data packet; and the second performance data is appended to the second normal data packet.

93. A communications device for selecting communications channels for a communications system that uses a frequency hopping protocol, the communications device comprising:

an interface configured to receive data from a plurality of communications devices and to transmit data to other communications devices; and a mechanism communicatively coupled to the interface and configured to:

select, based upon performance of a plurality of communications channels and at least one performance criterion, a first communications channel from the plurality of communications channels;

generate first channel identification data that both identifies the first communications channel and specifies that the first communications channel is not to be used;

provide the first channel identification data to a first communications device over a second communications channel of the plurality of communications channels, wherein the second communications channel is not the first communications channel;

receive a first communication from the first communications device over a third communications channel, wherein the first communication includes first performance data that indicates the performance of the second communications channel;

select, based upon the performance of the plurality of communications channels and the at least one performance criterion, a fourth communications channel from the plurality of communications channels;

generate second channel identification data that both identifies the fourth communications channel and specifies that the fourth communications channel is not to be used;

provide the second channel identification data to a second communications device over a fifth communications channel of the plurality of communications channels, wherein the fifth communications channel is not the fourth communications channel; and receive a second communication from the second communications device over a sixth communications channel, wherein the second communication includes second performance data that indicates the performance of the fifth communications channel.

94. The communications device of claim 93, wherein the mechanism is further configured to:

classify one or more communications channels of the plurality of communications channels as either good or bad based upon the performance of the one or more communications channels and at least one performance criterion;

wherein the mechanism is further configured to select the first communications channel from the plurality of communications channels by:

selecting the first communications channel from the one or more communications channels that are classified as bad; and wherein the mechanism is further configured to select the fourth communications channel from the plurality of communications channels by:

selecting the fourth communications channel from the one or more communications channels that are classified as bad.

95. The communications device of claim 93, wherein:

the mechanism is further configured to provide the first channel identification data to a first communications device by:

creating a first data packet that includes the first channel identification data; and sending the first data packet to the first communications device over the second communications channel; and the mechanism is further configured to provide the second channel identification data to a second communications device by:

creating a second data packet that includes the second channel identification data; and sending the second data packet to the second communications device over the fifth communications channel.

96. The communications device of claim 95, wherein:

the first data packet comprises a first normal data packet;

the first channel identification data is appended to the first normal data packet;

the second data packet comprises a second normal data packet; and the second channel identification data is appended to the second normal data packet.

97. The communications device of claim 93, wherein:

the first communication comprises a first reply data packet that includes the first performance data;

the second communication comprises a second reply data packet that includes the second performance data;

the first reply data packet comprises a first normal data packet;

the first performance data is appended to the first normal data packet;

the second reply data packet comprises a second normal data packet; and the second performance data is appended to the second normal data packet.

* * * * *

UNITED STATES PATENT AND TRADEMARK OFFICE
CERTIFICATE OF CORRECTION

| | |
|---|---|
| PATENT NO. | : 7,570,614 B2 |
| APPLICATION NO. | : 09/948499 |
| DATED | : August 4, 2009 |
| INVENTOR(S) | : Bijan Treister et al. |

It is certified that error appears in the above-identified patent and that said Letters Patent is hereby corrected as shown below:

Column 34
Claim 15: Line 9, delete "communication" and insert --communications--

Column 35
Claim 25: Line 37, delete "communication" and insert --communications--

Column 36
Claim 30: Line 26, delete "communication" and insert --communications--

Column 37
Claim 36: Line 18, delete "communication" and insert --communications--

Column 41
Claim 54: Line 17, delete "52" and insert --53--

Column 41
Claim 55: Line 20, delete "52" and insert --53--

Column 41
Claim 56: Line 33, delete "52" and insert --53--

Column 41
Claim 57: Line 41, delete "52" and insert --53--

Column 41
Claim 58: Line 66, delete "52" and insert --53--

Column 42
Claim 59, Line 10, delete "52" and insert --53--

UNITED STATES PATENT AND TRADEMARK OFFICE
CERTIFICATE OF CORRECTION

PATENT NO.         : 7,570,614 B2
APPLICATION NO.    : 09/948499
DATED              : August 4, 2009
INVENTOR(S)        : Bijan Treister et al.

It is certified that error appears in the above-identified patent and that said Letters Patent is hereby corrected as shown below:

Column 42
Claim 60: Line 20, delete "52" and insert --53--

Column 42
Claim 61: Line 34, delete "52" and insert --53--

Column 43
Claim 66: Line 29, delete "52" and insert --53--

Signed and Sealed this

Twenty-ninth Day of December, 2009

David J. Kappos
*Director of the United States Patent and Trademark Office*